US012094289B2

United States Patent
(12) United States Patent
Frenkel et al.

(10) Patent No.: US 12,094,289 B2
(45) Date of Patent: Sep. 17, 2024

(54) VARIABLE PAYBACK GAMING

(71) Applicant: AG 18, LLC, Denver, CO (US)

(72) Inventors: Brian Frenkel, Denver, CO (US); Jordan Simons, Denver, CO (US)

(73) Assignee: AG 18, LLC, Denver, CO (US)

( * ) Notice: Subject to any disclaimer, the term of this patent is extended or adjusted under 35 U.S.C. 154(b) by 382 days.

(21) Appl. No.: 17/091,898

(22) Filed: Nov. 6, 2020

(65) Prior Publication Data

US 2021/0256803 A1 Aug. 19, 2021

Related U.S. Application Data

(60) Continuation of application No. 15/948,608, filed on Apr. 9, 2018, now Pat. No. 10,832,519, which is a (Continued)

(51) Int. Cl.
*G07F 17/32* (2006.01)
*G07F 17/34* (2006.01)

(52) U.S. Cl.
CPC .......... *G07F 17/3239* (2013.01); *G07F 17/32* (2013.01); *G07F 17/3209* (2013.01); *G07F 17/3211* (2013.01); *G07F 17/3225* (2013.01); *G07F 17/3241* (2013.01); *G07F 17/3244* (2013.01); *G07F 17/3246* (2013.01); (Continued)

(58) Field of Classification Search
CPC .. G07F 17/32; G07F 17/3209; G07F 17/3211; G07F 17/3225; G07F 17/3239; G07F 17/3241; G07F 17/3244; G07F 17/3246; G07F 17/3248; G07F 17/3255; G07F 17/3258; G07F 17/3272; G07F 17/3276; G07F 17/3279; G07F 17/3288; G07F 17/3293; G07F 17/3295; G07F 17/34
See application file for complete search history.

(56) References Cited

U.S. PATENT DOCUMENTS 4,685,677 A 8/1987 Demar et al.
4,760,527 A 7/1988 Sidley
(Continued)

FOREIGN PATENT DOCUMENTS

CN 101044520 A 9/2007
JP 2004-65339 A 3/2004
(Continued)

OTHER PUBLICATIONS

Allway, Ryan, "Jackpot Acquires PokerTek Assets From Multimedia Games," TDM Financial, 2 pages, Jul. 2, 2015.
(Continued)

*Primary Examiner* — Milap Shah

(57) ABSTRACT

A system for interactive gaming among a plurality of players includes a host computer system and a plurality of player terminals communicably coupled to the host computer system or gaming platform via a network. The plurality of player terminals may be located at a plurality of licensed gaming locations. The plurality of player terminals may be configured to engage the plurality of players in a common interactive game operated by the host computer system. The plurality of player terminals can include means for dispensing player winnings from the player terminal.

18 Claims, 14 Drawing Sheets

Related U.S. Application Data continuation of application No. 15/802,231, filed on Nov. 2, 2017, now Pat. No. 9,940,780, which is a continuation of application No. 15/258,669, filed on Sep. 7, 2016, now Pat. No. 9,830,768, which is a division of application No. 15/192,821, filed on Jun. 24, 2016, now Pat. No. 9,589,417, which is a continuation-in-part of application No. 14/880,001, filed on Oct. 9, 2015, now Pat. No. 9,396,611, which is a continuation of application No. 11/183,247, filed on Jul. 14, 2005, now Pat. No. 9,159,195.

(52) U.S. Cl.
CPC ...... *G07F 17/3248* (2013.01); *G07F 17/3255* (2013.01); *G07F 17/3258* (2013.01); *G07F 17/3272* (2013.01); *G07F 17/3276* (2013.01); *G07F 17/3279* (2013.01); *G07F 17/3288* (2013.01); *G07F 17/3293* (2013.01); *G07F 17/3295* (2013.01); *G07F 17/34* (2013.01)

(56) References Cited

U.S. PATENT DOCUMENTS

| | | | | |
|---|---|---|---|---|
| 4,926,327 | A | 5/1990 | Sidley | |
| 5,257,179 | A | 10/1993 | DeMar | |
| 5,472,194 | A | 12/1995 | Breeding et al. | |
| 5,755,621 | A | 5/1998 | Marks et al. | |
| 5,762,552 | A | 6/1998 | Vuong et al. | |
| 5,800,268 | A | 9/1998 | Molnick | |
| 5,816,915 | A | 10/1998 | Kadlic | |
| 5,882,260 | A | 3/1999 | Marks et al. | |
| 5,984,779 | A | 11/1999 | Bridgeman et al. | |
| 6,007,426 | A * | 12/1999 | Kelly | G07F 17/3244 463/16 |
| 6,093,100 | A | 7/2000 | Singer et al. | |
| 6,104,815 | A | 8/2000 | Alcorn et al. | |
| 6,264,561 | B1 | 7/2001 | Saffari et al. | |
| 6,347,086 | B1 | 2/2002 | Strachan | |
| 6,508,709 | B1 | 1/2003 | Karmarkar | |
| 6,676,522 | B2 | 1/2004 | Rowe et al. | |
| 6,679,777 | B2 | 1/2004 | Pfeiffer et al. | |
| 6,764,397 | B1 | 7/2004 | Robb | |
| 6,767,284 | B1 | 7/2004 | Koza | |
| 6,931,131 | B1 | 8/2005 | Becker, Jr. et al. | |
| 6,964,608 | B1 | 11/2005 | Koza | |
| D512,466 | S | 12/2005 | White et al. | |
| 7,040,987 | B2 | 5/2006 | Walker et al. | |
| 7,100,916 | B2 | 9/2006 | Kelly et al. | |
| 7,306,516 | B2 | 12/2007 | Losilevsky | |
| 7,361,091 | B2 | 4/2008 | Letovsky | |
| 7,367,563 | B2 | 5/2008 | Yoseloff et al. | |
| 7,680,038 | B1 | 3/2010 | Gourlay | |
| 7,699,695 | B2 | 4/2010 | White et al. | |
| 7,699,702 | B2 | 4/2010 | Daniel | |
| 7,758,411 | B2 | 7/2010 | Crawford, III et al. | |
| 7,794,324 | B2 | 9/2010 | White et al. | |
| 7,867,091 | B2 | 1/2011 | Moshal | |
| 7,914,381 | B2 | 3/2011 | Blythe et al. | |
| D646,336 | S | 10/2011 | Kelly et al. | |
| D646,337 | S | 10/2011 | Kelly et al. | |
| 8,052,526 | B2 | 11/2011 | Abbott et al. | |
| 8,070,582 | B2 | 12/2011 | Lutnick et al. | |
| 8,235,791 | B2 | 8/2012 | Kelly | |
| 8,235,792 | B2 | 8/2012 | Kelly | |
| 8,241,106 | B2 | 8/2012 | Kelly | |
| 8,298,067 | B2 | 10/2012 | Kelly et al. | |
| 8,392,506 | B2 | 3/2013 | Rowe et al. | |
| 8,460,109 | B2 | 6/2013 | Bryson et al. | |
| 8,491,393 | B2 | 7/2013 | Yang | |
| 8,529,349 | B2 | 9/2013 | Kelly et al. | |
| 8,531,293 | B2 | 9/2013 | Putz | |
| 8,535,158 | B2 | 9/2013 | Kelly et al. | |
| 8,545,311 | B2 | 10/2013 | Shore et al. | |
| 8,613,656 | B2 | 12/2013 | Wudtke et al. | |
| 8,616,958 | B2 | 12/2013 | Hermansen et al. | |
| 8,632,392 | B2 | 1/2014 | Shore et al. | |
| 8,657,666 | B2 | 2/2014 | Wudtke et al. | |
| 8,657,676 | B2 | 2/2014 | Kelly et al. | |
| 8,678,914 | B2 | 3/2014 | Young | |
| 8,715,053 | B2 | 5/2014 | Kelly et al. | |
| 8,721,427 | B2 | 5/2014 | Kelly et al. | |
| 8,727,892 | B1 | 5/2014 | Chun | |
| 8,734,231 | B2 | 5/2014 | Shore et al. | |
| 8,734,238 | B2 | 5/2014 | Arnone et al. | |
| 8,764,566 | B2 | 7/2014 | Miltenberger et al. | |
| 8,777,720 | B2 | 7/2014 | Kelly et al. | |
| 8,821,270 | B2 | 9/2014 | Arnone et al. | |
| 8,821,296 | B1 | 9/2014 | Smurfit et al. | |
| 8,827,803 | B2 | 9/2014 | Kelly | |
| 8,856,657 | B2 | 10/2014 | Arbogast et al. | |
| 8,888,578 | B2 | 11/2014 | Kelly et al. | |
| 8,926,422 | B2 | 1/2015 | Anderson et al. | |
| 8,944,916 | B2 | 2/2015 | Abouchar et al. | |
| 8,992,307 | B2 | 3/2015 | Young | |
| 8,992,323 | B2 | 3/2015 | Kelly et al. | |
| 9,092,944 | B2 | 7/2015 | Kisenwether et al. | |
| 9,159,195 | B2 * | 10/2015 | Frenkel | G07F 17/3293 |
| 9,269,221 | B2 | 2/2016 | Gobbi et al. | |
| 9,275,514 | B2 | 3/2016 | Kelly et al. | |
| 9,336,962 | B2 | 5/2016 | Wudtke et al. | |
| 9,396,611 | B2 * | 7/2016 | Frenkel | G07F 17/3251 |
| 9,430,909 | B2 | 8/2016 | Shore et al. | |
| 9,483,908 | B2 | 11/2016 | Shore et al. | |
| 9,530,282 | B2 | 12/2016 | Graboyes Goldman et al. | |
| 9,811,976 | B2 | 11/2017 | Shore et al. | |
| 9,830,768 | B2 * | 11/2017 | Frenkel | G07F 17/3288 |
| 9,940,780 | B2 * | 4/2018 | Frenkel | G07F 17/3288 |
| 10,226,687 | B2 | 3/2019 | Grauzer et al. | |
| 10,832,519 | B2 * | 11/2020 | Frenkel | G07F 17/32 |
| 11,583,758 | B2 | 2/2023 | Lutnick et al. | |
| 2001/0000118 | A1 | 4/2001 | Sines et al. | |
| 2001/0004609 | A1 | 6/2001 | Walker et al. | |
| 2001/0019965 | A1 | 9/2001 | Ochi et al. | |
| 2001/0037211 | A1 | 11/2001 | McNutt et al. | |
| 2001/0044337 | A1 | 11/2001 | Rowe et al. | |
| 2002/0002075 | A1 | 1/2002 | Rowe | |
| 2002/0025851 | A1 | 2/2002 | Frankulin et al. | |
| 2002/0028707 | A1 | 3/2002 | Pascal et al. | |
| 2002/0049975 | A1 * | 4/2002 | Thomas | G06Q 50/34 725/60 |
| 2002/0066996 | A1 | 6/2002 | Nelson et al. | |
| 2002/0094869 | A1 | 7/2002 | Harkham | |
| 2002/0098884 | A1 | 7/2002 | Adams | |
| 2002/0103028 | A1 | 8/2002 | Carter et al. | |
| 2002/0103029 | A1 | 8/2002 | Finlayson et al. | |
| 2002/0123377 | A1 | 9/2002 | Shulman | |
| 2002/0169015 | A1 | 11/2002 | Moody | |
| 2003/0003997 | A1 | 1/2003 | Vuong et al. | |
| 2003/0032474 | A1 | 2/2003 | Kaminkow | |
| 2003/0064805 | A1 | 4/2003 | Wells | |
| 2003/0109306 | A1 | 6/2003 | Karmarkar | |
| 2003/0125973 | A1 | 7/2003 | Mathews et al. | |
| 2003/0130041 | A1 | 7/2003 | Pascal et al. | |
| 2003/0139190 | A1 | 7/2003 | Steelberg et al. | |
| 2003/0176218 | A1 | 9/2003 | LaMay et al. | |
| 2003/0224854 | A1 | 12/2003 | Joao | |
| 2003/0236120 | A1 | 12/2003 | Reece et al. | |
| 2004/0038721 | A1 | 2/2004 | Wells | |
| 2004/0162124 | A1 | 8/2004 | Barton | |
| 2004/0192431 | A1 | 9/2004 | Singer et al. | |
| 2004/0192442 | A1 | 9/2004 | Wells et al. | |
| 2004/0259626 | A1 | 12/2004 | Akram et al. | |
| 2005/0026696 | A1 | 2/2005 | Hashimoto et al. | |
| 2005/0037842 | A1 | 2/2005 | Kastner | |
| 2005/0043094 | A1 | 2/2005 | Nguyen et al. | |
| 2005/0059458 | A1 | 3/2005 | Griswold et al. | |
| 2005/0090304 | A1 | 4/2005 | Crawford, III et al. | |
| 2005/0116020 | A1 | 6/2005 | Smolucha et al. | |
| 2005/0130728 | A1 | 6/2005 | Nguyen et al. | |
| 2005/0143169 | A1 | 6/2005 | Nguyen et al. | |
| 2005/0181870 | A1 | 8/2005 | Nguyen et al. | |
| 2005/0187020 | A1 | 8/2005 | Amaitis et al. | |

(56) References Cited

U.S. PATENT DOCUMENTS

2005/0193209 A1 9/2005 Saunders et al.
2005/0212214 A1 9/2005 Pfeiffer et al.
2005/0215326 A1 9/2005 Iosilevsky
2006/0019745 A1 1/2006 Benbrahim
2006/0025221 A1 2/2006 Jain et al.
2006/0052150 A1 3/2006 Hedrick et al.
2006/0052157 A1 3/2006 Walker et al.
2006/0058008 A1 3/2006 Choksi
2006/0058088 A1 3/2006 Crawford, III et al.
2006/0080175 A1 4/2006 Rowe et al.
2006/0095790 A1 5/2006 Nguyen et al.
2006/0121968 A1 6/2006 Daniel
2006/0148550 A1 7/2006 Nee, Jr. et al.
2006/0148560 A1 7/2006 Arezina et al.
2006/0189381 A1 8/2006 Daniel et al.
2006/0205484 A1 9/2006 Nicastro
2006/0229122 A1 10/2006 Macke
2006/0258425 A1 11/2006 Edidin et al.
2006/0287103 A1 12/2006 Crawford, III et al.
2007/0015584 A1* 1/2007 Frenkel ............... G07F 17/3209 463/42
2007/0024002 A1 2/2007 McMain et al.
2007/0054739 A1 3/2007 Amaitis et al.
2007/0087834 A1 4/2007 Moser et al.
2007/0202941 A1 8/2007 Miltenberger et al.
2007/0207855 A1 9/2007 Moody et al.
2007/0213112 A1* 9/2007 Humphrey .......... G07F 17/3244 463/12
2007/0259709 A1 11/2007 Kelly et al.
2007/0259716 A1 11/2007 Mattice et al.
2007/0265092 A1 11/2007 Betteridge
2007/0298857 A1 12/2007 Schlottmann et al.
2008/0004107 A1 1/2008 Nguyen et al.
2008/0020848 A1 1/2008 Muir et al.
2008/0045317 A1 2/2008 Seelig et al.
2008/0070658 A1 3/2008 Abgold et al.
2008/0096650 A1 4/2008 Baerlocher
2008/0102957 A1 5/2008 Burman et al.
2008/0113782 A2 5/2008 Moshal
2008/0113803 A1 5/2008 Alderucci
2008/0132214 A1 6/2008 Dupray et al.
2008/0188309 A1 8/2008 Moshal
2008/0214288 A1 9/2008 Toneguzzo
2008/0248845 A1 10/2008 Morgan et al.
2008/0248849 A1 10/2008 Lutnick et al.
2008/0274802 A1 11/2008 Joao
2009/0062008 A1 3/2009 Karmarkar
2009/0082082 A1 3/2009 Carr-Gregg et al.
2009/0088253 A1 4/2009 Oberberger et al.
2009/0093300 A1 4/2009 Lutnick et al.
2009/0118016 A1 5/2009 Ben-Artzi et al.
2009/0124376 A1 5/2009 Kelly et al.
2009/0149246 A1 6/2009 Opaluch
2009/0186701 A1 7/2009 Rowe et al.
2009/0203432 A1 8/2009 Carter, Sr.
2009/0227362 A1 9/2009 Kelly et al.
2009/0239667 A1 9/2009 Rowe et al.
2009/0264203 A1 10/2009 Warkentin
2009/0270175 A1 10/2009 Kelly et al.
2009/0276341 A1 11/2009 McMahan et al.
2009/0276715 A1 11/2009 Arbogast et al.
2009/0318219 A1 12/2009 Koustas et al.
2009/0325686 A1 12/2009 Davis et al.
2009/0325695 A1 12/2009 Wudtke et al.
2009/0325715 A1 12/2009 Kelly et al.
2010/0035694 A1 2/2010 Losica
2010/0041470 A1 2/2010 Preisach
2010/0056243 A1* 3/2010 Czyzewski ......... G07F 17/3295 463/16
2010/0062840 A1 3/2010 Herrmann
2010/0113140 A1 5/2010 Kelly et al.
2010/0240431 A1 9/2010 Herrmann et al.
2010/0273546 A1 10/2010 Lior et al.
2010/0317442 A1 12/2010 Thomas et al.
2011/0034237 A1 2/2011 Schulhof et al.
2011/0269436 A1 11/2011 Porco
2012/0046110 A1 2/2012 Amaitis et al.
2012/0052939 A1 3/2012 Lutnick et al.
2012/0135801 A1 5/2012 Finnimore et al.
2012/0143906 A1 6/2012 Sibbold et al.
2012/0149457 A1 6/2012 Loose et al.
2012/0237908 A1 9/2012 Fitzgerald et al.
2012/0276983 A1 11/2012 Young
2012/0322544 A1 12/2012 Rowe et al.
2013/0005428 A1 1/2013 Kelly
2013/0035152 A1 2/2013 Kelly
2013/0053118 A1* 2/2013 Schueller ............ G07F 17/3223 463/19
2013/0080238 A1 3/2013 Kelly et al.
2013/0143640 A1 6/2013 Young
2013/0225268 A1 8/2013 Caputo et al.
2013/0225282 A1 8/2013 Williams et al.
2013/0231180 A1 9/2013 Kelly et al.
2013/0288785 A1 10/2013 Arnone et al.
2013/0296047 A1 11/2013 Borissov et al.
2013/0303274 A1 11/2013 Gadher et al.
2013/0331158 A1 12/2013 Kurtz et al.
2013/0331163 A1 12/2013 Kroeckel et al.
2013/0331184 A1 12/2013 Kelly et al.
2014/0051497 A1 2/2014 Lang et al.
2014/0094256 A1 4/2014 Hilbert et al.
2014/0094272 A1 4/2014 Kelly et al.
2014/0094279 A1 4/2014 Lockard et al.
2014/0194199 A1 7/2014 DiGiovanni
2014/0221071 A1* 8/2014 Calio .................. G07F 17/3225 463/31
2014/0243076 A1 8/2014 Arnone et al.
2014/0274268 A1* 9/2014 Marshall ............. G07F 17/3241 463/16
2014/0287826 A1 9/2014 Zhao et al.
2014/0370959 A1 12/2014 Yacenda
2014/0370983 A1 12/2014 Suzuki et al.
2014/0378219 A1 12/2014 Arnone et al.
2015/0081888 A1 3/2015 Pham
2015/0130134 A1 5/2015 Lucier
2015/0194012 A1 7/2015 Hendrickson et al.
2015/0287264 A1* 10/2015 De Viveiros Ortiz ....................... G07F 17/3244 463/25
2015/0294535 A1 10/2015 Hightower et al.
2016/0071369 A1 3/2016 Graves et al.
2016/0078709 A1 3/2016 Stanford et al.
2016/0092988 A1 3/2016 Letourneau
2016/0098888 A1 4/2016 Andres
2016/0133123 A1 5/2016 Giobbi et al.
2017/0287269 A1 10/2017 Arnone et al.
2022/0157131 A1 5/2022 Lutnick et al.

FOREIGN PATENT DOCUMENTS

JP 2008-513110 A 5/2008
JP 2008-178478 A 8/2008
JP 2008-220431 A 9/2008
JP 2008-546443 A 12/2008
JP 2010-128915 A 6/2010
JP 2013-162889 A 8/2013
JP 5414273 B2 11/2013
JP 2014-524064 A 9/2014
JP 2015-502207 A 1/2015
JP 2016-76230 A 5/2016
KR 2001-0050000 A 6/2001
KR 2006-0049774 A 5/2006
KR 2013-0122904 A 11/2013
WO WO 2003/093921 A2 11/2003
WO WO 2004/071601 A2 8/2004
WO WO 2012/167146 A1 12/2012

OTHER PUBLICATIONS

Amatic Industries GmbH, "Solitaire & Satellite," http://www.amatic.com/products/roulette/solitaire-satellite/, 5 pages, 2016, published prior to Jun. 24, 2016.

(56) References Cited

OTHER PUBLICATIONS

American Casino Guide, YouTube Video for "A Look At New Skill-Based Slots And Other Skill-Based Gaming Machines With Marcus Prater From AGEM," https://www.youtube.com/watch?v=wNjrG1mgabw&feature=youtu.be, 4 pages, Feb. 15, 2016.
American Casino Guide, YouTube Video for "A Look At Two New Skill-Based Video Games Coming To Casinos—Pinball And A Pac-Man Clone," https://www.youtube.com/watch?v=DsEveU9Q-is&feature=youtu.be, 2 pages, Apr. 8, 2016.
American Casino Guide, YouTube Video for "Skill-Based Slot Machines From Gamblit Gaming," https://www.youtube.com/watch?v=11WJgLm0zLk&feature=youtu.be, 2 pages, Dec. 11, 2015.
American Casino Guide, YouTube Video for "Take 'n Play Gaming System From Bally Technologies," https://youtu.be/o8k170fUq0o, 3 pages, Jan. 15, 2015.
Aristocrat Technologies Australia Pty Ltd, "Poker Machines," 5 pages, 2016, published prior to Jun. 24, 2016.
Bally Technologies, Inc., "Alpha Pro iDeck," 1 page, 2016, published prior to Jun. 24, 2016.
Bally Technologies, Inc., "Bally Live Floor View," https://www.ballytech.com/Systems/Analytics/Bally-Live-Floor-View, 1 page, 2016, published prior to Jun. 24, 2016.
Bally Technologies, Inc., "Frequently Asked Questions About iView Display Manager," 2 pages, 2014.
Bally Technologies, Inc., "Home," http://www.ballytech.com/, 1 page, 2016, published prior to Jun. 24, 2016.
Bally Technologies, Inc., "Server-Based Solutions," 1 page, 2016, published prior to Jun. 24, 2016.
Bally Technologies, Inc., "Take 'n Play," https://www.ballytech.com/games/Take-'n-Play, 1 page, 2016, published prior to Jun. 24, 2016.
Bally Technologies, Inc., "Wayfinder," https://www.ballytech.com/Systems/Media-Management/CoolSign/Wayfinder, 1 page, 2016, published prior to Jun. 24, 2016.
Berzon, Alexandra, "Are Slot Machines About To Get Smart?," The Wall Street Journal, 4 pages, Jun. 15, 2016.
Bruzda, Natalie, "Esports Amenities Attract Customers To The Downtown Grand," Las Vegas Review—Journal, Inc., 4 pages, Jun. 14, 2016.
Buckeye Charity Poker, YouTube Video for "PokerTek Tables," https://www.youtube.com/watch?v=LhDe3dfSucU&feature=youtu.be, 2 pages, Oct. 15, 2012.
Cams, LLC, "What We Do," 4 pages, 2015.
CBS This Morning, YouTube Video for "Video Games That Pay Out In Vegas," https://www.youtube.com/watch?v=i10RU23Uvng&feature=youtu.be, 2 pages, Oct. 7, 2015.
Ceasars Interactive Entertainment, Inc., "WSOP Tournaments Same IP Address Issue," http://forum.wsop.com/chat/wsop-tournaments-same-ip-address-issue, 6 pages, 2015.
Dianaevoni, YouTube Video for "Frogger Slot Machine-Preview-G2e-Konami Gaming," https://www.youtube.com/watch?v=S_DlkonEMWU&feature=youtu.be, 3 pages, Oct. 11, 2015.
Dye, Dave, "Graboyes Betting On Video Game Slot Machines," Gaming Today.com, 4 pages, Apr. 26, 2016.
Dynamic Gaming Systems, YouTube Video for "Shaq Jack," https://youtu.be/gPYeNXrEIDQ, 2 pages, May 30, 2014.
European Patent Application No. 17159425.2, Extended European Search Report, 9 pages, Apr. 10, 2017.
Fantini Research, YouTube Video for "Scientific Games," https://www.youtube.com/watch?v=6wEqlsGp6uM, 2 pages, Sep. 30, 2015.
Feldberg, Sarah, "In Pursuit Of A Winning Strategy: Getting Millennials To Gamble," Travel Weekly, 7 pages, May 4, 2016.
Fitzgerald, Clare, "Nevada Gaming Policy Committee Gets A Lesson In eSports," Casino City, 2 pages, May 16, 2016.
Fogel, Stefanie, "Bringing eSports To A Las Vegas Casino," Polygon, 4 pages, Apr. 28, 2016.
Gamblit Gaming, LLC, "Gaming Meets Gambling," 4 pages, 2016.
Gamblit Gaming, LLC, "NGCB SB9 Regulations Public Input," 15 pages, 2015.
GameAccount Network Plc, "Delivering Your Business Online," http://www.gan.com, 4 pages, Apr. 16, 2016.
GameCo Inc., "The Video Game Casino," http://oco.gg/, 9 pages, 2015.
Gameco, Inc., Press Release for "GameCo Announces Partnership With Suzo-Happ To Develop Controller For Its Video Game Gambling Machine," PR Newswire Association LLC, 3 pages, Dec. 15, 2015.
Gameco, Inc., Press Release for "Skill-Based Video Game Gambling Company GameCo, Inc., Announces Gaming License In Progress With Division Of Gaming Enforcement In New Jersey," PR Newswire Association LLC, 2 pages, Mar. 16, 2016.
Gaming Intelligence Services Ltd., "Jackpot Digital To Acquire PokerTek From Multimedia Games," 6 pages, Jul. 3, 2015.
Gaming Intelligence Services Ltd., "New Jersey Regulator Fines GAN Over Geolocation Failures," http://www.gamingintelligence.com/legal/38444-new-jersey-regulator-fines-gan-over-geolocation-failures, 3 pages, 2015.
Gaming Laboratories International LLC, "GLI Standards," 5 pages, 2016, published prior to Jun. 24, 2016.
Gaming Laboratories International, LLC, "GLI-21: Client Server Systems," Version 2.2, 26 pages, Sep. 6, 2011.
Gaming Standards Association, Brochure for "End Of Life Strategy, SAS," 2 pages, undated, published prior to Jun. 24, 2016.
Graft, Kris, "The Man Behind XBLA Places Bet On Skill-Based, Real-Money Gaming On Mobile," Gamasutra, 3 pages, Jun. 8, 2016.
Henderson, Hartley, "eSports And Skill Based Video Games Could Be The Future Of Gambling," OSGA, LLC, 3 pages, Mar. 16, 2016.
Heuer, Mike, "eSports Goes Big In Las Vegas," CDC Gaming Reports, 2 pages, Apr. 19, 2016.
Hwang, Jeff, "G2E 2015: Evaluating The Skill-Based Games," The Motley Fool, 12 pages, Oct. 11, 2015.
IGamingBusiness, "GameAccount Granted US Patent For iBridge Framework," http://www.igamingbusiness.com/news/gameaccount-granted-us-patent-ibridge-framework, 3 pages, Sep. 18, 2014.
IGT, Product Brochure for "IGT Floor Manager," 1 page, 2015.
IGT Global Solutions Corporation, "Centipede—Reel Edge—Video Slot," http://www.igt.com/games/centipede----reel-edge-20r40l1024w200c-ascent-mld-video-reel-sc3 , 3 pages, 2016, published prior to Jun. 24, 2016.
IGT Global Solutions Corporation, "Home," http://www.igt.com, 4 pages, 2016, published prior to Jun. 24, 2016.
IGT Global Solutions Corporation, "Reel Edge Blood Life—Slot," http://www.igt.com/games/reel-edge-blood-life-3r5lcmb-s-avp-spinning-reel-gw9, 3 pages, 2016, published prior to Jun. 24, 2016.
IGT Global Solutions Corporation, Product Brochure for "IGT Tournament Manager," 5 pages, 2016, published prior to Jun. 24, 2016.
IGT, "Slot Accounting System Protocol," 5 pages, undated, published prior to Jun. 24, 2016.
IGT, Product Brochure for "IGT Casinolink Slot Management," 1 page, 2015.
IGT, Product Brochure for "IGT Machine Accounting," 1 page, 2016, published prior to Jun. 24, 2016.
IGT, Product Brochure for "IGT Media Manager," 1 page, 2016, published prior to Jun. 24, 2016.
IGT, Product Brochure for "IGT Multi-Denomination Multi-Game," 1 page, 2016, published prior to Jun. 24, 2016.
IGT, Product Brochure for "Mobile Host 2.0," 1 page, 2016, published prior to Jun. 24, 2016.
IGT, Product Brochure for "Property Info," 1 page, 2016, published prior to Jun. 24, 2016.
IGT, Product Brochure for "sbX Analytics," 1 page, 2015.
IGT, Product Brochure for "Table Manager," 1 page, 2016, published prior to Jun. 24, 2016.
IGT, Product Brochure for "Tournament Manager 5.0," 2 pages, 2016, published prior to Jun. 24, 2016.
IGT, Product Brochure for "Visual Slot Performance Tool," 1 page, 2016, published prior to Jun. 24, 2016.
IGT, YouTube Video for "Reel Edge Slots Series—Live From G2E 2010 IGT Presents Reel Edge Skill-Based Slot Machines," http://youtu.be/WTW846HFC1U, 2 pages, Nov. 12, 2010.

(56) References Cited

OTHER PUBLICATIONS

International Application No. PCT/US2006/027339, International Search Report & Written Opinion, 6 pages, Jan. 16, 2007.
International Application No. PCT/US2017/020950, International Search Report & Written Opinion, 12 pages, Jul. 3, 2017.
ISDgames, "About ISDgames," http://www.isdgames.com/about-isdgames, 1 page, 2015.
ISDgames, "NetPoker," http://www.playnetpoker.net/, 1 page, 2012.
Japanese Patent Application No. 2017-161782, Office Action, 5 pages, Dec. 18, 2017.
Japanese Patent Application No. 2018-023692, Office Action, 7 pages, May 29, 2018.
Japanese Patent Application No. 2018-023693, Office Action, 6 pages, May 29, 2018.
Japanese Patent Application No. 2018-198082, Office Action, 11 pages, Jan. 7, 2020.
Japanese Patent Application No. 2019-232490, Office Action, 6 pages, Sep. 1, 2020.
Japanese Patent Application No. 2020-013215, Office Action, 6 pages, Jun. 24, 2020.
Japanese Patent Application No. 2020-013216, Office Action, 6 pages, Jun. 24, 2020.
Korean Patent Application No. 2020-7001427, Notice of Allowance, 3 pages, Jan. 29, 2020.
Kent, Steve, "Darion Lowenstein: Mixing It Up In Real-Money Gaming|Casual Connect Video," GameSauce, 12 pages, Mar. 21, 2016.
Kim, Sangmin et al., "Design And Implementation Of Casino Slot Machine Accounting Protocol Engine," Advanced Science and Technology Letters, vol. 54, pp. 65-68, 2014.
Komenda, Ed, "How Online Poker Companies Track Players And Verify Their Location," Vegas Inc., 4 pages, Sep. 24, 2013.
Konami Gaming, Inc., "Home," http://www.gaming.konami.com/, 1 page, 2016, published prior to Jun. 24, 2016.
Konami Gaming, Inc., "Industry Recognizes Konami Gaming, Inc.'s True-Time Tournament With Innovative Gaming Technology Award," 2 pages, Apr. 23, 2013.
Konami Gaming, Inc., "Konami Partners With Spin Games To Deliver Online Slot Game Content Via Remote Gaming Server," 3 pages, Sep. 22, 2015.
Konami Gaming, Inc., YouTube Video for "Introducing The First Frogger Slot Machine," https://www.youtube.com/watch?v=JSXC1zKCGzE&Feature=youtu.be, 2 pages, Apr. 27, 2016.
Leap Forward Gaming, "SaffariNet Features & Benefits," 2 pages, Aug. 31, 2015.
Leap Forward Gaming, "SaffariNet," 3 pages, 2016, published prior to Jun. 24, 2016.
Leap Forward Gaming, Inc., Product Brochure for "SaffariNet," 2 pages, undated, published prior to Jun. 24, 2016.
LocationSmart, "Home," https://www.locationsmart.com, 4 pages, Jun. 23, 2016.
Meltzer, Marc, "Will Skill-Based Slots Reach Younger Casino Patrons, Scare Away Bluehairs?," Covers Media Group Ltd., 3 pages, Sep. 23, 2015.
MicroFirst Gaming Inc., "Home," http://www.microfirst.com/, 3 pages, 2016, published prior to Jun. 24, 2016.
Morris, J. D., "Coming Soon To Casinos: Betting On Yourself," Vegas Inc., 4 pages, Sep. 28, 2015.
Morris, J. D., "Look To The Future: Games On Display At G2E Show Transition To Skill-Based Products," Vegas Inc., 4 pages, Oct. 2, 2015.
NanoTech Gaming, Inc., "News," http://www.nanotechgaming.com/news.php, 1 pages, 2015.
Nevada Gaming Control Board, "History Of Adopted Regulations, Technical Standards, & Technical Policies," 10 pages, 2016, published prior to Jun. 24, 2016.
Nevada Gaming Control Board, "Regulation 14, Manufacturers, Distributors, Operators Of Inter-Casino Linked Systems, Gaming Devices, New Games, Inter-Casino Linked Systems, On-Line Slot Metering Systems, . . . ," 33 pages, Nov. 2015.
Nevada Gaming Control Board, "Regulation 5, Operation Of Gaming Establishments, Adoption Of New Regulation 5.220: Operation Of A Mobile Gaming System," 3 pages, Mar. 23, 2006.
Nevada Gaming Control Board, "Regulations," 402 pages, Feb. 2015.
Nevada Gaming Control Board, "Technical Standards For Gaming Devices And Associated Equipment, Definitions," 3 pages, Feb. 15, 2016.
Nevada Gaming Control Board, "Technical Standards For Gaming Devices And Associated Equipment, Standard 1, Integrity Of Gaming Devices," 15 pages, Feb. 15, 2016.
Nevada Gaming Control Board, "Technical Standards For Gaming Devices And Associated Equipment, Standard 2, Proper Accounting For Gaming Devices," 5 pages, Feb. 15, 2016.
Nevada Gaming Control Board, "Technical Standards For Gaming Devices And Associated Equipment, Standard 3, Integrity Of And Proper Accounting For On-Line Slot Systems And Cashless Wagering Systems," 7 pages, Aug. 2011.
Nevada Gaming Control Board, "Technical Standards For Gaming Devices And Associated Equipment, Standard 4, Mobile Gaming Systems," 1 page, Aug. 2011.
Nevada Gaming Control Board, "Technical Standards For Gaming Devices And Associated Equipment, Standard 5, Cashless Wagering Kiosk," 2 pages, Aug. 2011.
Nevada Gaming Control Board, "Technical Standards For Gaming Devices And Associated Equipment, Standard 6, Interactive Gaming Systems And Associated Equipment," 13 pages, Jan. 27, 2012.
Nevada, Senate Bill No. 9—Committee On Judiciary—Impact of Technology on Gaming, 3 pages, Dec. 19, 2014.
New Jersey, Temporary Regulation 13:69E-1.28Y, "Skill Based Gaming," 2 pages, Feb. 2016.
Newswire, "E-Gaming Spotlights Its Latest Game Mixes For E-Neon Cabinets," 1 page, 2016, published prior to Jun. 24, 2016.
OnlineCasino.org, "GameCo Wants To Bring Skill-Based Games To A Struggling Atlantic City," http://www.onlinecasino.org/news/gamecowantstobringskill-basedgamestoastrugglingatlanticcity, 4 pages, 2016, published prior to Jun. 24, 2016.
Paddy Power, "Live Casino," http://livecasino.paddypower.com/holdem, 2 pages, 2016, published prior to Jun. 24, 2016.
Parry, Wayne, "New Jersey Issues Rules To Allow Skill-Based Gambling," CDC Gaming Reports, 2 pages, Feb. 23, 2016.
Pierceall, Kimberly, "Casinos Could See Guitar-Playing, Car-Racing, Card-Grabbing," Associated Press, 7 pages, Dec. 5, 2015.
Pierceall, Kimberly, "Skill-Based Slot Machines Inch Closer To Nevada Casinos," Las Vegas Sun, 3 pages, Sep. 3, 2015.
Povich, Elaine S., "State Gambling Revenues Take Hit From Millennials' Habits," TucsonSentinel.com, 4 pages, Sep. 15, 2015.
Preston, Marjorie, "Not So Random: Skill Games & The Casino Of The Future," Global Gaming Business Magazine, 4 pages, Mar. 24, 2016.
Random $$ Slots, YouTube Video for "Race Ace & Centipede Slot Machines—Skill-Based Bonus From IGT (G2E)," https://www.youtube.com/watch?v=lkadUMiA6rc&feature=youtu.be, 3 pages, Oct. 2, 2014.
Reagan, Ronald, "America's Great Economic Miracle," 3 pages, Mar. 1, 1975.
San Manuel Casino, "Daily Login Bonus Terms & Conditions," https://play.sanmanuel.com/terms-and-conditions.shtml, 18 pages, Oct. 13, 2015.
San Manuel Casino, YouTube Video for "Konami's Frogger—Now At San Manuel," https://www.youtube.com/watch?v=A-0C86j8cog&feature=youtu.be, 2 pages, May 9, 2016.
San Manuel Indian Bingo & Casino, "Privacy Policy," https://sanmanuel.com/privacy-policy, 4 pages, Jun. 22, 2012.
San Manuel Indian Bingo & Casino, "Terms & Conditions," https://play.sanmanuel.com/terms-and-conditions.shtml, 24 pages, 2015.
Scientific Games, "Home," http://www.scientificgames.com/, 1 page, 2015.
Smed, Jouni et al., "Can We Prevent Collusion In Multiplayer Online Games," Proceedings of the Ninth Scandinavian Conference on Artificial Intelligence, 9 pages, Oct. 2006.
Spin Games LLC, "OurTechnology," http://www.spingames.net/our-technology/, 5 pages, 2016, published prior to Jun. 24, 2016.

(56) References Cited

OTHER PUBLICATIONS

Spin Games LLC, "Spin Games Awarded Patent," 4 pages, Apr. 17, 2014.
Staff Writer, "New Jersey Issues Rules For Skill Gaming," Casino Connection, vol. 13, No. 5, 2 pages, May 2016.
Staff Writer, "The Millennial Problem: Why We (Don't) Gamble," The Motley Fool, 18 pages, Sep. 19, 2015.
Stradbrooke, Steven, "Paradise Ent Inks IGT Technology Deal, Forces SHFL To Cry 'Uncle' In Patent Suit," CalvinAyre.com, 7 pages, May 7, 2016.
Stutz, Howard, "State Gaming Authorities OK Skill-Based Slot Machine Regulations," Las Vegas Review-Journal, Inc., 4 pages, Sep. 17, 2015.
Takahashi, Dean, "GSN's Sparcade Lets You Play Classic Arcade Games Like Pac-Man On Mobile For Real Money," VentureBeat, 3 pages, Jun. 8, 2016.
Twitch Interactive, Inc., "About Twitch," https://www.twitch.tv/p/about, 3 pages, 2016, published prior to Jun. 24, 2016.
Vice Media LLC, "eSports—Part 1," http://www.vice.com/video/esports-part-one, 4 pages, 2016, published prior to Jun. 24, 2016.
Vulcun, "Home," http://vulcun.com, 3 pages, 2015.
Wargo, Buck, "Las Vegas Manufacturer Konami Wants To Grow Market Share," Las Vegas Review-Journal, Inc., 4 pages, Jun. 4, 2016.
Wheeler, Robert, "A Panoramic View Of The Gaming Industry," Bally Technologies, European Gaming Compliance Technology Expo '08, 13 pages, 2008.
Wikipedia, "eSports," 14 pages, May 31, 2016.
Wikipedia, "Video Lottery Terminal," 4 pages, Nov. 1, 2015.
Wikipedia, "Xfire," 12 pages, Apr. 2016.
WMS Gaming Inc., "Home," http://www.wms.com, 1 page, 2015.
Xfire, "Home," http://www.xfire.com, 2 pages, 2016, published prior to Jun. 24, 2016.
Yogonet Group, Exclusive Interview with Blaine Graboyes, CEO, GameCo, 5 pages, Apr. 13, 2016.
Zacks Equity Research, "IGT Shows Portfolio Strength," 4 pages, Apr. 5, 2012.
Zarlengo, Philip, Master's Thesis for "Leveraging Slot Gaming Technology To Gain A Competitive Advantage," University of Nevada, Las Vegas, 43 pages, Fall 2011.
Japanese Patent Application No. 2019-232493, Office Action, 11 pages, Mar. 16, 2021.
Japanese Patent Application No. 2020-013213, Office Action, 8 pages, Feb. 2, 2021.
Japanese Patent Application No. 2020-013214, Office Action, 9 pages, Feb. 2, 2021.
Petition For Inter Partes Review Of U.S. Pat. No. 10,497,220, *DraftKings Inc.* vs. *AG 18, LLC*, IPR2022-01442, 106 pages, Aug. 22, 2022.
Petition For Inter Partes Review Of U.S. Pat. No. 11,024,131, *DraftKings Inc.* vs. *AG 18, LLC*, IPR2022-01445, 94 pages, Aug. 30, 2022.
Petition For Inter Partes Review Of U.S. Pat. No. 9,978,205, *DraftKings Inc.* vs. *AG 18, LLC*, IPR2022-01446, 102 pages, Aug. 23, 2022.
Petition For Inter Partes Review Of U.S. Pat. No. 9,613,498, *DraftKings Inc.* vs. *AG 18, LLC*, IPR2022-01447, 102 pages, Aug. 23, 2022.
Petition For Inter Partes Review Of U.S. Pat. No. 10,614,657, *DraftKings Inc.* vs. *AG 18, LLC*, IPR2022-01448, 98 pages, Aug. 23, 2022.
Japanese Patent Application No. 2020-013216, Office Action, 9 pages, Oct. 20, 2020 (includes English translation).
Korean Patent Application No. 2020-7012392, Office Action, 12 pages, Aug. 26, 2020 (includes English translation).
Korean Patent Application No. 2020-7016736, Office Action, 8 pages, Sep. 11, 2020 (includes English translation).
Macau Patent Application No. I/1494, Office Action, 12 pages, Nov. 22, 2018 (includes English translation).
Australian Patent Application No. 2022200378, Examination Report, 7 pages, Mar. 28, 2023.
Decision Granting Institution Of Inter Partes Review for U.S. Pat. No. 10,497,220, *DraftKings Inc.* vs. *AG 18, LLC*, IPR2022-01442, 38 pages, Mar. 14, 2023.
Decision Granting Institution Of Inter Partes Review for U.S. Pat. No. 11,024,131, *DraftKings Inc.* vs. *AG 18, LLC*, IPR2022-01445, 33 pages, Mar. 14, 2023.
Decision Granting Institution Of Inter Partes Review for U.S. Pat. No. 9,978,205, *DraftKings Inc.* vs. *AG 18, LLC*, IPR2022-01446, 43 pages, Mar. 14, 2023.
Decision Granting Institution Of Inter Partes Review for U.S. Pat. No. 9,613,498, *DraftKings Inc.* vs. *AG 18, LLC*, IPR2022-01447, 57 pages, Mar. 14, 2023.
Decision Granting Institution Of Inter Partes Review for U.S. Pat. No. 10,614,657, *DraftKings Inc.* vs. *AG 18, LLC*, IPR2022-01448, 47 pages, Mar. 14, 2023.
Patent Owner's Response To Petition To Institute Inter Partes Review for U.S. Pat. No. 10,497,220, *DraftKings Inc.* vs. *AG 18, LLC*, IPR2022-01442, 69 pages, Jun. 7, 2023.
Patent Owner's Response To Petition To Institute Inter Partes Review for U.S. Pat. No. 11,024,131, *DraftKings Inc.* vs. *AG 18, LLC*, IPR2022-01445, 67 pages, Jun. 7, 2023.
Patent Owner's Response To Petition To Institute Inter Partes Review for U.S. Pat. No. 9,978,205, *DraftKings Inc.* vs. *AG 18, LLC*, IPR2022-01446, 72 pages, Jun. 7, 2023.
Patent Owner's Response To Petition To Institute Inter Partes Review for U.S. Pat. No. 9,613,498, *DraftKings Inc.* vs. *AG 18, LLC*, IPR2022-01447, 41 pages, Jun. 7, 2023.
Patent Owner's Response To Petition To Institute Inter Partes Review for U.S. Pat. No. 10,614,657, *DraftKings Inc.* vs. *AG 18, LLC*, IPR2022-01448, 52 pages, Jun. 7, 2023.
Judgment Final Written Decision for U.S. Pat. No. 10,497,220, *DraftKings Inc.* vs. *AG 18, LLC*, IPR2022-01442, 76 pages, Mar. 12, 2024.
Judgment Final Written Decision for U.S. Pat. No. 11,024,131, *DraftKings Inc.* vs. *AG 18, LLC*, IPR2022-01445, 73 pages, Mar. 12, 2024.
Judgment Final Written Decision for U.S. Pat. No. 9,978,205, *DraftKings Inc.* vs. *AG 18, LLC*, IPR2022-01446, 102 pages, Mar. 12, 2024.
Judgment Final Written Decision for U.S. Pat. No. 9,613,498, *DraftKings Inc.* vs. *AG 18, LLC*, IPR2022-01447, 92 pages, Mar. 13, 2024.
Judgment Final Written Decision for U.S. Pat. No. 10,614,657, *DraftKings Inc.* vs. *AG 18, LLC*, IPR2022-01448, 111 pages, Mar. 12, 2024.
Japanese Patent Application No. 2021-203853, Notice of Allowance, 3 pages, Nov. 28, 2023.
Australian Patent Application No. 2022200378, Examination Report No. 2, 6 pages, Jul. 6, 2023.
Australian Patent Application No. 2022200378, Examination Report No. 3, 5 pages, Oct. 3, 2023.
Japanese Patent Application No. 2021-199005, Notice of Allowance, 3 pages, Sep. 5, 2023.

* cited by examiner

VARIABLE PAYBACK GAMING

CROSS REFERENCE TO RELATED APPLICATIONS

This application is a continuation of U.S. patent application Ser. No. 15/948,608, filed on Apr. 9, 2018, and issued as U.S. Pat. No. 10,832,519 on Nov. 10, 2020; which is a continuation of U.S. patent application Ser. No. 15/802,231, filed on Nov. 2, 2017, and issued as U.S. Pat. No. 9,940,780 on Apr. 10, 2018; which is a continuation of U.S. patent application Ser. No. 15/258,669, filed on Sep. 7, 2016, and issued as U.S. Pat. No. 9,830,768 on Nov. 28, 2017; which is a divisional of U.S. patent application Ser. No. 15/192,821, filed on Jun. 24, 2016, and issued as U.S. Pat. No. 9,589,417 on Mar. 7, 2017; which is a continuation-in-part of U.S. patent application Ser. No. 14/880,001, filed on Oct. 9, 2015, and issued as U.S. Pat. No. 9,396,611 on Jul. 19, 2016; which is a continuation of U.S. patent application Ser. No. 11/183,247, filed on Jul. 14, 2005, and issued as U.S. Pat. No. 9,159,195 on Oct. 13, 2015; each of which is hereby incorporated by reference in its entirety for all purposes.

TECHNICAL FIELD

Various embodiments of the technology relate generally to gaming systems. More specifically, some embodiments of the technology relate to systems and methods for providing interactive gaming among a plurality of players.

BACKGROUND

The popularity of gambling has increased at extraordinary rates. Many casinos are opening or reopening poker rooms and Internet poker sites are popping up regularly. Casinos are also looking for new games and ways to attract players. New players are coming to the casinos daily.

There are, however, several impediments to new players joining the ranks of poker players and other gamblers. First, with respect to Internet poker and other online gambling, the legality has not been tested, despite its ever-increasing popularity. Many people simply do not want to risk the possibility of running afoul of the law. Second, many people are simply not comfortable interacting with off-shore enterprises, which is where Internet poker and other gambling sites are located to avoid the reach of U.S. laws. In order to play at these sites, players must deposit money, which is not immediately accessible by the player. Many people do not trust off-shore sites to hold their money. Third, creating an account at an Internet poker or other gambling site requires a potential player to divulge personal information that many people simply do not wish to share. No one knows the limits of how the information will be used. Further, some people prefer anonymity, which is simply not possible with known Internet poker and other gambling sites. Hence, for at least these reasons, many people are not becoming poker players through Internet poker opportunities who otherwise would.

Casino poker tables can provide impediments to new players. For example, the process of getting on a list to play, getting into a table game, and interacting with the many characters you will find in a poker room often intimidates new players to the point of disinterest.

For at least the foregoing reasons, improved systems and methods are needed for providing interactive gaming opportunities to players.

SUMMARY

Various embodiments of the present technology provide for systems and methods for interactive gaming among a plurality of players. In accordance with some embodiments, an interactive gaming system can include a host computer system and a plurality of player terminals communicably coupled to the host computer system via a network. The plurality of player terminals can be located at a plurality of licensed gaming locations and/or remotely from licensed gaming locations. The plurality of player terminals can be configured to engage the plurality of players in a common interactive game operated by the host computer system. The plurality of player terminals can include various means or mechanisms for dispensing player winnings from the player terminal.

In some embodiments, the interactive game may be a game of skill, a game of chance, or a hybrid game of skill and chance. The host computer system may be located at a location different from any of the plurality of player terminals. Each player terminal may include means for receiving player deposits. The means for receiving player deposits may include a bill accepter. When the interactive game is poker, one or more of the plurality of player terminals may include means for receiving a user input to view hole cards dealt to the user in the course of the interactive game. The hole cards otherwise may not be viewable at the terminal. The host computer system may include means for monitoring actions taken by one or more of the plurality of players to thereby detect collusion among the players. The host computer system may include means for tracking one or more jackpots payable by an operator of one of the plurality of licensed gaming locations. The at least one of the one or more jackpots may include a high hand jackpot for making a specific hand. The at least one of the plurality of player terminals may include means for displaying at least one of the one or more jackpots payable by an operator of the host computer system. The host computer system may include means for tracking one or more jackpots payable by an operator of the host computer system. At least one of the one or more jackpots may include a bad beat jackpot for having a hand with a value at or above a specific value beaten by a hand with a value at or above a different specific value. At least one of the plurality of player terminals may include means for displaying at least one of the one or more jackpots payable by an operator of the host computer system. The host computer system may include means for tracking a player's play to thereby reward the player for player loyalty. The player terminals at a given location may be arranged to thereby inhibit collusion among players using the player terminals at the given location while engaged in a common game.

In other embodiments, a system for interactive gaming among a plurality of players includes a host computer system and a plurality of player terminals communicably coupled to the host computer system via a network. The plurality of player terminals are located at a plurality of licensed gaming locations. The plurality of player terminals are configured to anonymously engage the plurality of players in a common interactive game operated by the host computer system.

In still other embodiments, a method of operating an interactive game among a plurality of players includes initiating a game session at a host computer system. The method also includes joining the plurality of players to the game session via a network. The players are operating player terminals located at a plurality of licensed gaming locations. At least one of the plurality of players is joined to the game without creating a user account relating to the interactive game. The method also includes initiating the game and, from the host computer system, sending signals relating to the state of the game to the player terminals. The method further includes, at a host computer system, iteratively receiving signals from the player terminals. The signals indicate player actions in the game. The method further includes, at the conclusion of the game, awarding value to a winning player.

In some embodiments, the method includes dispensing player winnings to one of the players from the player's player terminal. The interactive game may be poker. The host computer system may be located at a location different from any of the plurality of player terminals. The method may include receiving a deposit from a player at one of the player terminals. Receiving a deposit from a player at one of the player terminals may include receiving a deposit from a player via a bill accepter. The method may further include, at a player terminal, receiving a user input to view hole cards dealt to the user in the course of the interactive game. The hole cards otherwise may not be viewable at the terminal. The method also may include monitoring actions taken by one or more of the plurality of players to thereby detect collusion among the players. The method also may include tracking one or more jackpots payable by an operator of one of the plurality of licensed gaming locations. At least one of the one or more jackpots may be a high hand jackpot for making a specific hand. The method may include, at a player terminal, displaying at least one of the one or more jackpots payable by an operator of the host computer system. The method may include tracking one or more jackpots payable by an operator of the host computer system. At least one of the one or more jackpots may be a bad beat jackpot for having a hand with a value at or above a specific value beaten by a hand with a value at or above a different specific value. The method also may include, at a player terminal, displaying at least one of the one or more jackpots payable by an operator of the host computer system. The method may include tracking a player's play to thereby reward the player for player loyalty. The method may include arranging terminals at a given location to thereby inhibit collusion among players using the player terminals at the given location while engaged in a common game. The method may include inhibiting collusion among players using the player terminals at the given location while engaged in a common game by prohibiting a player from joining a specific game session at a terminal proximate a player terminal of another player engaged in the specific game session.

BRIEF DESCRIPTION OF THE DRAWINGS

A further understanding of the nature and advantages of the present technology may be realized by reference to the remaining portions of the specification and the drawings wherein like reference numerals are used throughout the several drawings to refer to similar components. Further, various components of the same type may be distinguished by following the reference label with a dash and a second label that distinguishes among the similar components. If only the first reference label is used in the specification, the description is applicable to any one of the similar components having the same first reference label irrespective of the second reference label.

Embodiments of the present technology will be described and explained through the use of the accompanying drawings as follows.

Figure 1:
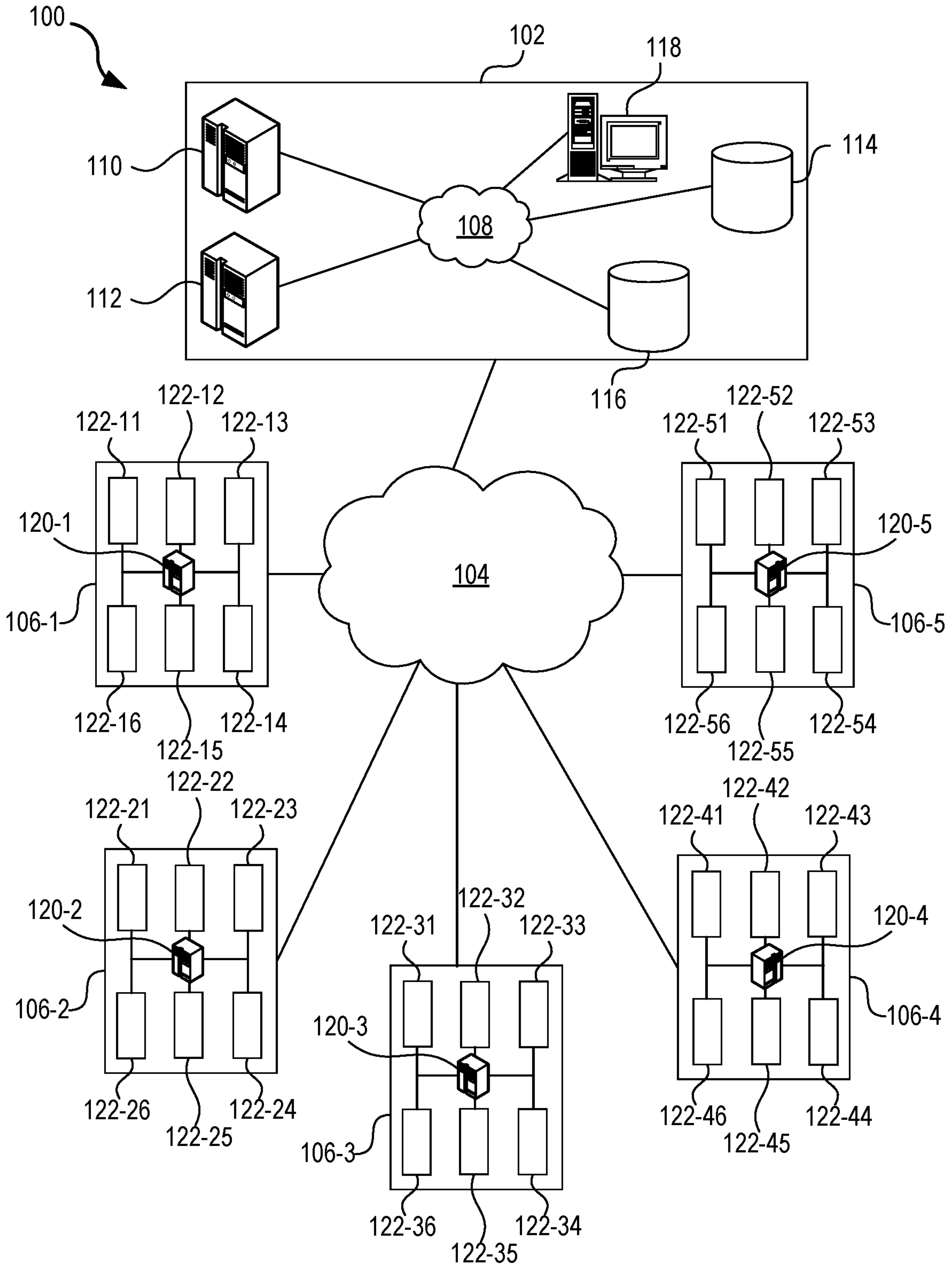
FIG. 1 illustrates an exemplary interactive gaming system according to some embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology provide networked, interactive gaming. According to some embodiments of the technology, players may engage in interactive games that require at least one player decision after the game has begun. Interactive games can include games of skill, games of chance and/or hybrid games that mix games of chance and games of skill. Examples of interactive games include, but are not limited to, poker, blackjack, video and arcade games, virtual reality games, eSports, live dealer, pinball, games of chance with bonus rounds that include games of skill, and others. The interactive games can include head-to-head games where one player or team of players compete directly against another player or team of players. In some embodiments, the interactive game may be a single player game where the player is trying to meet various objectives (e.g., score a desired number of points, reach a certain level, complete a screen within a limited time frame, and the like).

With respect to poker, for example, a player must decide whether to bet, raise, call, or fold after having seen his cards and the action of other players. With respect to blackjack, a player must decide whether to hit, stand, split, double down, or surrender after having seen his cards and the dealer's up card. With respect to video games, player interactions are needed throughout the game to make decisions to navigate obstacles, fire weapons, and the like depending on the particular video game. Other games can have similar actions during the progress of the game. These types of player decisions are in direct contrast with slot machines in which players merely decide to initiate a game, after which no player decision is made until the conclusion of the game. In other words, no intermediate decisions are made in non-interactive games.

"Networked" gaming allows players to participate from different locations, although in some embodiments, players may play from a common location via a local network. The game, however, is typically administered by a processor separate from a player's terminal. By allowing participation from a large number of locations simultaneously, the quality and variety of the gaming opportunity is enhanced through increased demand. "Interactive games," unlike, for example, slots, require at least one player decision after the game has begun.

Some embodiments of the technology also provide players the opportunity to participate in networked gaming anonymously. Unlike, for example, Internet poker, in which a player must disclose at least some personal information to create a player account, embodiments of the present technology allow players to enter a game without disclosing any personal information. While some embodiments provide loyalty programs to encourage longer sessions, return customers, and the like, players are not required to participate in loyalty programs. Players may simply deposit funds into a player terminal and enter a game. Hence, no disclosure of personal information is required to participate in games according to embodiments of the present technology.

Further, according to various embodiments, player terminals can be located at licensed gaming locations. Licensed gaming locations can include any state or, in the future, federal land whereby a player can play on a personal computing device through a network with a licensed operator. Licensing may be governed by the Nevada Gaming Control, tribal council, and/or a regulatory agency setup within a state. In the future, the federal government may permit federal licenses for certain operators. For example, if Caesars Entertainment is licensed in Nevada and someone is playing on their system/networked servers that would be permitted and considered a licensed jurisdiction. Some states, jurisdictions or specific areas (e.g., schools, churches, etc.) may still have bans on gambling in those locations. As such, some embodiments of the present technology may use various location deriving techniques (e.g., geolocation, GPS signals, IP addresses, and others) to determine if the player terminals that are mobile are in a banned location or in a location where gambling would be permitted.

This also contrasts with traditional Internet poker and the like, wherein player terminals (e.g., personal computers, table tops, laptops, tablets, smartphones, and the like) may be located anywhere. Hence, according to some embodiments of the technology, a player may engage in these games without fear of running afoul of gambling laws. While locations may include casinos, restaurants, bars, race tracks, hotels (including individual hotel rooms), and the like, players are secure in the fact that the location is authorized to provide the gaming opportunity.

Further still, in some embodiments, efforts are made to protect players from unsavory activities that have prevented the emergence of such gaming opportunities heretofore. For example, collusion and other forms of cheating are addressed through player terminal placement, privacy features, electronic monitoring, and/or the like. Hence, players are provided an enhanced gaming opportunity, even with respect to "live" games in which cheating is often hard to detect, since a casino does not see every player's hole cards, players are able to "mark" cards since the cards are physically handled, and colluding players can use sophisticated forms of signaling that go unnoticed by the dealer, floor personnel, or the "eye in the sky." In some embodiments, payouts may be withheld for a period of time (e.g., 24 or 48 hours) to allow for a review of the game play by various hardware and/or software systems that can be used to detect colluding players or other types of cheating.

In some embodiments, the player terminals will need to display various information about the gaming session the player is about to enter. This information can include various rules, limitations and payouts. Since some player terminals may be able to support different games, variable payback, varying skill levels, and multiple profit models (e.g., rake, fixed fee, etc.), the player terminal can display this type of information clearly to the user.

Players also may compete for enhanced prizes over and above the current "pot." For example, in poker, players may be given bonus jackpots for hitting a certain, usually rare, hand (e.g., a Royal Flush). Also, players may receive a "consolation prize" in the form of a "bad beat" jackpot (e.g., having an aces full house beaten by four of a kind or better). These jackpots may be progressive and could grow to be much more valuable than the contested pot. In blackjack, players can receive bonuses for hitting, for example, an ace and jack of spades blackjack. In some embodiments, bonus rounds may be added with different interactive games (e.g., a game of skill or a game of chance). The bonus round games may be selected by the player before or after the main gaming session. In other embodiments, the bonus round may be randomly selected by the player terminal, the host computing system, or a gaming platform. Still yet, the bonus round may only be presented to players that win the main gaming session or the bonus round may be randomly presented. These and other features and enhancements will be described more fully in the ensuing detailed description.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to interactive gaming on various devices, embodiments of the present technology are equally applicable to various other cloud-based gaming technologies.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical discs, compact disc read-only memories (CD-ROMs), magneto-optical discs, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Attention is directed to FIG. 1, which illustrates an exemplary gaming network 100 according to embodiments of the technology. The gaming network 100 includes a host computer system 102 and a communications network 104 through which a plurality of gaming locations 106 communicate with the host computer system 102. It should be appreciated that the gaming network 100 is merely exemplary of a number of possible gaming network configurations according to embodiments of the present technology. Further, although the ensuing description will relate to a poker gaming network, this is not a requirement. Embodiments of the present technology may relate to many other types and varieties of games.

This exemplary host computer system 102 includes an internal network 108, a web server 110, a game server 112, a game storage arrangement 114, a player storage arrangement 116, and an administrator computing device 118. In this specific embodiment, the various components of the host computer system 102 are co-located; in other embodiments, the components may be distributed geographically. As those skilled in the art will appreciate, other exemplary host computer systems according to embodiments of the technology may include different components than those illustrated and described herein.

Each gaming location 106 may include a local server 120 and one or more player terminals 122. In some embodiments, the local server 120 may simply facilitate communication between the player terminals 122 and the host computer system 102. In other embodiments, the local server 120 administers the games, tracks players for loyalty purposes, manages player deposits, and/or the like. In some embodiments, there may be more than 1 server at these locations handling different aspects of the gaming system. For example, there may be servers dedicated to accounting and money management, servers dedicated for detecting collusion and/or other types of cheating (e.g., automated play), servers managing the loyalty/rewards systems, and the like.

The various servers, networks, computing devices, and storage arrangements may be any of a variety of well-known devices. For example, in some embodiments, the communications network 104 is the Internet, the servers 110, 112, 120 are standard products offered, for example, by Dell Corp., the storage arrangements 114, 116 are typical optical, magnetic, solid state, or similar mass storage devices, and the administrator computing device 118 is a typical desktop computer. The player terminals 122 will be described in greater detail below.

According to embodiments of the technology, the gaming locations 106 are licensed gaming locations, such as casinos, race tracks, licensed networks that comply with state or federal regulations, or the like. In some embodiments, the gaming locations 106 are gas stations, hotels, stores, airports, or other locations at which gaming is legal. The gaming locations 106 specifically exclude locations where gaming is not legal. In accordance with various embodiments, gaming locations need not be attended. As such, players may be able to enter and exit games, deposit and receive money, interact with the player's terminal, and the like, without the assistance of an attendant at the gaming location.

The player terminals 122 at the gaming locations 106 may be in wired or wireless communication with the local server 120. In accordance with various embodiments, player terminals 122 can include customized electronic devices built for interactive game play. In some embodiments, the player terminals 122 can include personal computing devices running customized software (e.g., a gaming application running on a mobile device such as a mobile phone or tablet). It should be appreciated that the terminals may be wirelessly connected directly to the host computer system 102 via the communications network 104. Other examples are possible. In some embodiments, hotel guests at casino/hotels may "check out" player terminals 122 and engage in gaming from their hotel rooms. In other embodiments, player terminals 122 are in every room in a hotel and players may engage in gaming using the terminals without ever leaving their rooms.

As will be described in greater detail below, in some embodiments, players can anonymously engage in games via the gaming network 100. That is, a player may insert cash into a terminal or otherwise deposit monetary value (e.g., via a credit card, PayPal®, digital currency transfer, etc.), select a game, and begin playing without creating a user account. This is a significant difference between embodiments of the present technology and previously-known gaming networks, such as Internet poker in which players must create user accounts.

As will be described in greater detail hereinafter, players may engage in interactive games from any location. For example, players at terminal 122-21 and 122-25 from gaming location 106-2 may be involved in the same poker game as players using terminals 122-53 and 122-56 from the gaming location 106-5. The host computer system 102 administers the game and distributes information about the action of the game to appropriate player terminals. Cards are dealt to players in the game, although players are only able to view their own cards and any community cards. Betting proceeds from one player to the next, and the host computer system 102 informs each player of the action prior to his turn.

Of course, all players in a particular game may be playing from the same location. The players may be playing next to one another at a common bank of machines or they may be distributed throughout the gaming location (e.g., some in their hotel rooms, some on one floor of a casino, and the remainder on another floor of the casino). Still yet, some players may be remotely located and playing via a network connection with players in a fixed gaming location. Other player may be playing from their homes, parks, restaurants, bars, and other locations. Many examples are possible.

It is important to note, however, that gaming locations and the gaming network operator may take special steps to ensure players are not the victim of collusion or other forms of cheating. For example, if two players playing from the same location are within eyesight of each other's terminals, then they may be able to see each other's hole cards or signal each other their holding. This form of collusion provides these players with a significant advantage over other players in the game. Similarly, an individual player may be the innocent victim of another player who can see his hole cards or other position within a game without his knowledge. Hence, the gaming location may employ any of a number of measures to prevent such cheating.

In some embodiments, when a player enters a game from a specific terminal at a gaming location, other terminals within proximity (e.g., three rows of machines, 100 feet, the same floor of the casino, etc.) of the player's terminal may be locked out of the game the player entered. Of course, nothing would prevent two players seated at terminals next to one another from playing in different games. Similarly, wireless terminals may have features that allow them to know when they are in proximity of one another and perform similar lockouts. For example, these features can include, in some embodiments, one or more of proximity sensors, IP address monitoring and tracing, reporting of GPS locations, beacon-based technology, and the like. As another example, player terminals may be distributed and fixed within a gaming location. Various mapping technology can be used to create location maps that can be used as part of the proximity detection.

With respect to an individual player who has another player looking over his shoulder to see his hole cards, player terminals may have a "hole card reveal" button or the like that allows players to quickly view their hole cards, whereas the cards are otherwise "face down" on the terminal display. While not a guarantee that other players cannot see his cards, a player using such a feature is better able to protect his hand. Shielding on the terminal and/or smaller displays or other features may be used to enhance a player's ability to protect his hand.

Despite all efforts to minimize cheating through visual means, players may nevertheless collude by communicating with one another via phone calls, texting, or the like. Such collusion may be dealt with in any of a variety of ways by various embodiments of the present technology. For example, player terminals or the gaming location in general may employ electronic countermeasures that disrupt cell phone signals. As one example, when the player terminals are personal computing devices (e.g., a smartphone or a tablet), the application running the gaming software may completely deactivate one or more features of the smartphone or tablet such as cellular service, texting, Internet, etc. Still yet, some embodiments of the gaming software may identify the mobile number associated with the mobile device. As such, any incoming call when a game is in session may use the caller ID to block (or securely withhold) calls or text messages from other players in the common gaming session.

In some embodiments, the gaming network operator may employ collusion detection software that monitors player action. Since the host computer system 102 knows all players' cards or activity within the gaming session, unusual action by a player may trigger a flag, after which the player's action is given higher scrutiny. Players suspected of colluding may be immediately barred from a game and their deposits held pending resolution.

Figure 2:
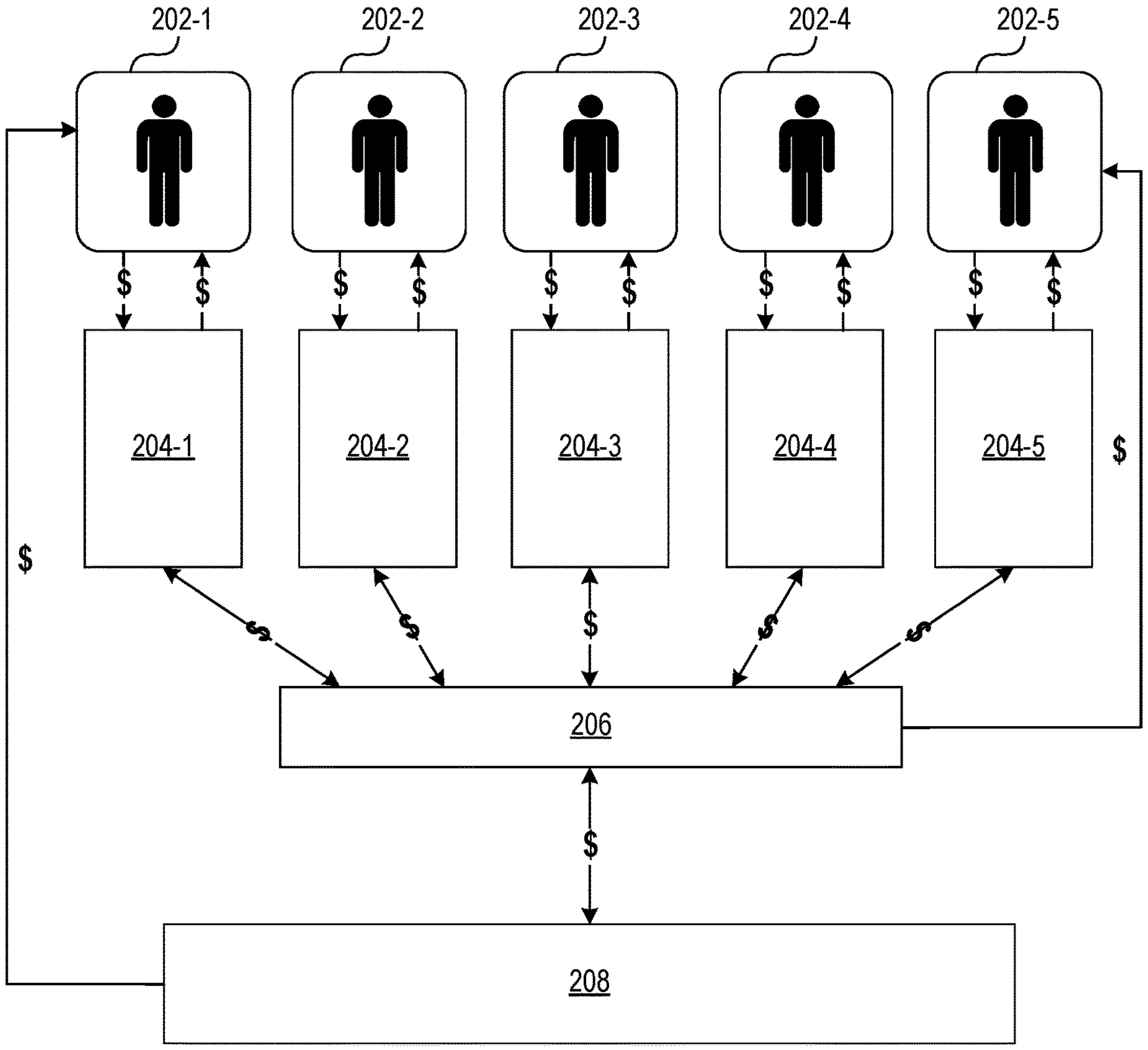
FIG. 2 illustrates graphically one example of how funds flow in an interactive gaming system, such as the system of FIG. 1, according to various embodiments of the present technology.

Having generally described a gaming network 100 according to embodiments of the technology, attention is directed to FIG. 2, which provides greater detail relating to the flow of funds in such a network. According to this example, players 202 engage in gaming using player terminals 204. The players 202 may insert value (e.g., cash, points, credits, etc.) into the terminals 204 to thereby engage in the games offered by the terminals. When a player 202-1 is ready to cash out of a game, the terminal 204-1 is configured to dispense value back to the player 202-1.

Excess value travels from the player terminals 204 to a local depository 206 and/or vice versa. In some cases, the value moves electronically, for example, if the value is measured in points or credits. In others cases, for example, if the value is in the form of paper currency and/or coin, value is physically moved from the local depository 206 to the player terminals 204 ("terminal fills") and vice versa. Occasionally, player cash outs are handled from the local depository 206 directly to the player. In one such example, a player 202-5 is due a higher cash out than the terminal 204-5 can provide. The player 202-5 may have experienced an exceptional winning session, the gaming location may require the player 202-5 to complete tax forms for IRS reporting, the player 202-5 may have won a specialty jackpot that is paid from the local depository 206, the player terminal 204-5 may be configured to only print "tickets" which players 202 redeem for cash at a cashier's cage, credit a player's loyalty card or bank card, and/or the like. Many other such examples exist.

In some examples, value is paid from a local depository 206 to a central depository 208 and vice versa. As in the immediately-previous discussion, the central depository 208 may occasionally pay value directly to a player 202-1.

In a specific embodiment, the local depository 206 is a licensed gaming location and the central depository 208 is the operator of the gaming network 100. The operator enlists the gaming location to house terminals in return for a portion of the revenue generated by the network. The compensation to the gaming location may be in proportion to the revenues generated at the gaming location. For example, if the gaming network operator provides interactive poker, each contested pot may be "raked" a certain percentage (e.g., 3% to a maximum of $4). Hence, the winning player's pot may be light a $4 rake. The gaming locations from which the players are engaged in the game may keep $2 of the $4, while the remainder is remitted to the operator. Because players may engage in the same poker game from different locations, occasional revenue balancing may be required to compensate gaming locations at which players have winnings in excess of deposits. Likewise, locations at which players lose more over a period of time provide the excess to the operator for distribution to the locations with the higher wins. In some embodiments, large payouts may be made by the manufacturer, the casino, or some other third party. For example, mega jackpots/progressives that are pooled can get paid by the manufactures in many instances.

Individual gaming locations and/or the operator of the gaming network may offer promotions to increase player interest. For example, as will be described in greater detail hereinafter, gaming locations may offer "high hand" jackpots. Such jackpots are paid to players for making particular high hands such as four aces, a royal flush, or the like. The jackpot may be reset to a starting value (e.g., $100 for four aces) and increase in proportion to revenues at the gaming locations until the high hand is again hit. Different gaming locations may have different high hand jackpot amounts. In fact, the high hand may be game specific, i.e., there may be one high hand jackpot for four aces in all Texas Hold'em games and a different four aces high hand jackpot for 7-card Stud games. Jackpots also may be specific to various game limits. High hand jackpots may be paid to players directly from the local depository 206.

The gaming network operator also may offer specialty jackpots, such as "bad beat" jackpots, in which players who have a high value hand beaten may share (e.g., four-of-a-kind beaten by a higher hand). As with the high hand jackpots, bad beat jackpots may reset to a nominal value after being hit and increase as a function of revenue. The revenue base for a bad beat jackpot offered by the gaming network operator may be substantially larger than the revenue base for locally-offered high hand jackpots, in which case, the bad beat jackpot may grow at a faster rate. As with the high hand jackpots, bad beat jackpots may be game and limit specific.

Of course, the preceding discussion should not be understood to limit bad beat jackpots to being offered by the gaming network operator or high hand jackpots to being offered by the local gaming location. Further, other types and varieties of jackpots may be offered at any level of the network.

Figure 3:
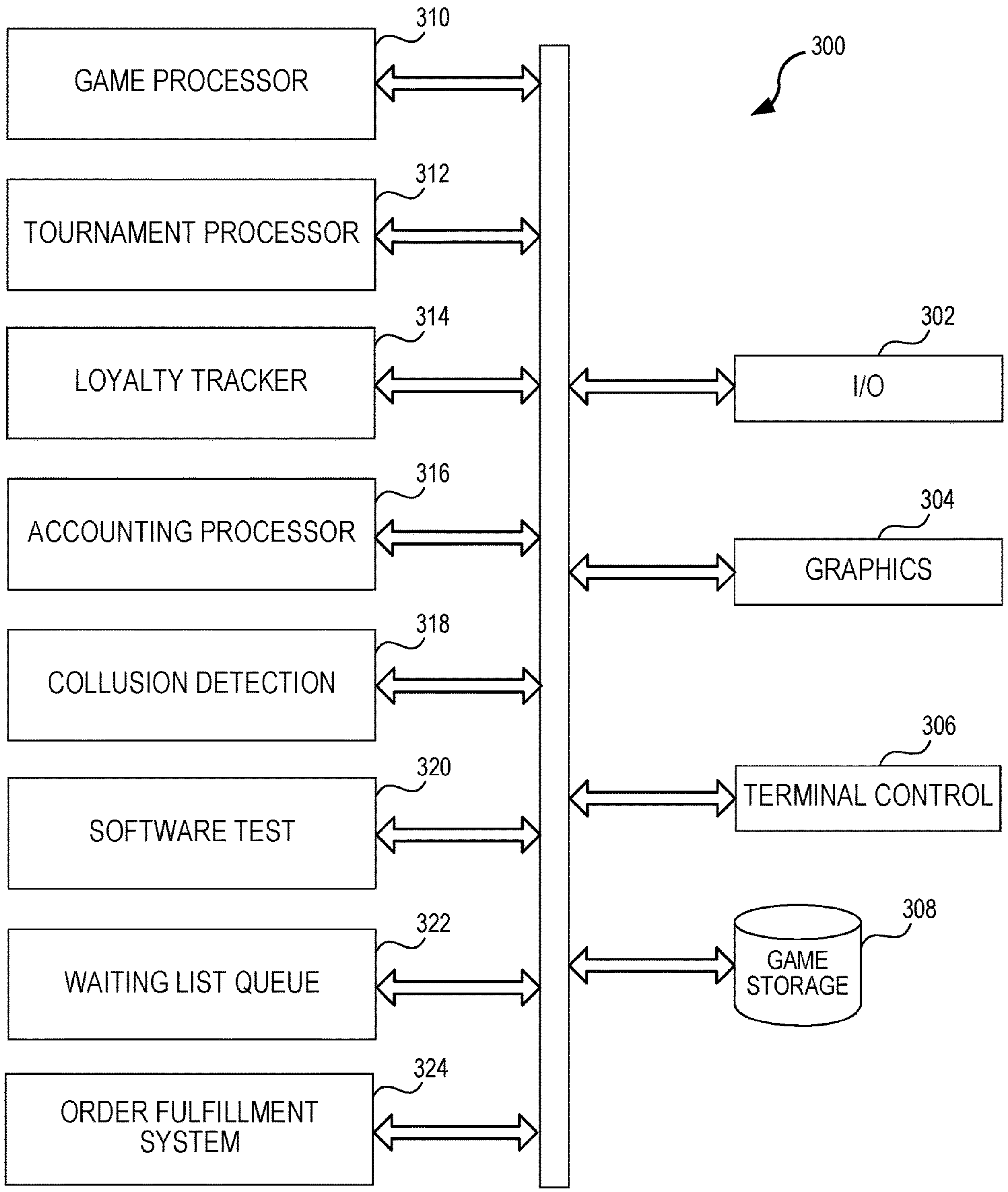
FIG. 3 illustrates an exemplary processing environment for an interactive gaming system according to one or more embodiments of the present technology.

Attention is directed to FIG. 3, which illustrates an exemplary functional diagram 300 of the host computer system 102. The functional diagram 300 depicts several program modules as well as basic computer functions. For example, the I/O module 302 handles input to and output from a processing environment and/or the communications network 104. The graphics module 304 provides control over the graphics displayed on player terminals and/or administrative computers. The terminal control module 306 provides the capability of the host computer system 102 to interact with and/or control a player terminal 122. The game storage arrangement 308 houses software or other computer-executable code that controls the games offered.

A number of processing environments are also included in some embodiments. For example, a game processor 310 controls one or more interactive games using the computer executable code from the game storage arrangement 308. A tournament processor 312 performs a similar function for player tournaments. A loyalty tracker 314 keeps up with the play of registered players to thereby reward players for the amount of time they spend playing. An accounting processor 316 controls the flow of money and/or other forms of value within the network. A collusion detection processor 318 monitors such things as unusual action taken by a specific player, frequent occurrences of the same players playing together in the same games, and the like. A software test environment 320 allows new games and/or processes to be tested in an environment that does not affect ongoing operations. A waiting list queue 322 allows players to wait in line for a specific game or table. Order fulfillment system 324 allows orders for various items (e.g., for food orders, beverage orders, ticket orders, reservations, etc.) that are placed at a player terminal to be received and processed.

Those skilled in the art will appreciate that this is but one of many possible exemplary functional diagrams for a gaming network according to embodiments of the technology.

Figure 4:
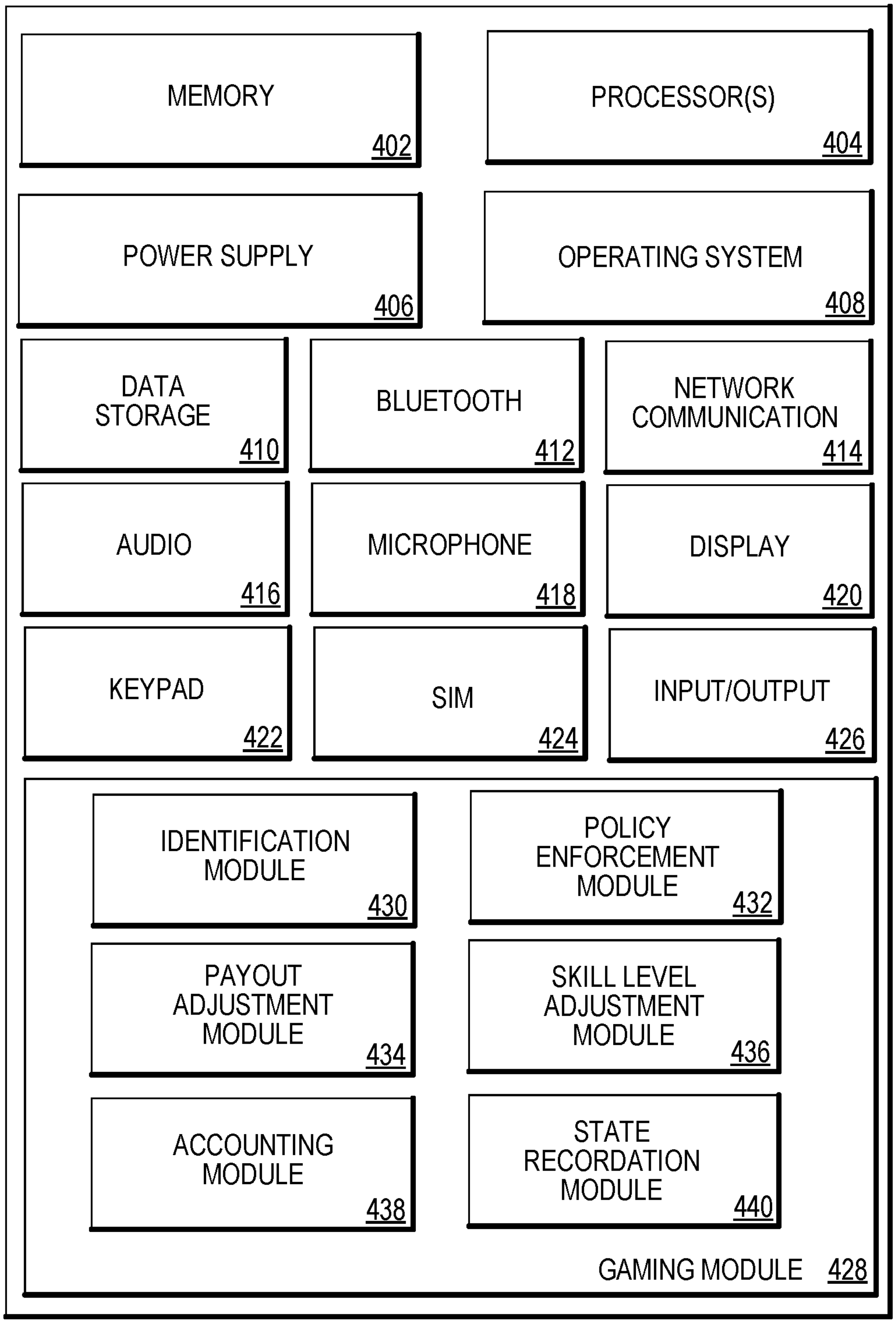
FIG. 4 illustrates an example of various components that may be used within a player terminal in accordance with some embodiments of the present technology.

FIG. 4 illustrates an example of various components that may be used within a player terminal in accordance with some embodiments of the present technology. As shown in FIG. 4, player terminals 122 may include memory 402 (e.g., volatile memory and/or nonvolatile memory), processor(s) 404, power supply 406 (e.g., battery), for executing processing instructions, and operating system 408. Additional components may include data storage component 410 (e.g., hard drive, flash memory, memory card, etc.), one or more network interfaces (e.g., Bluetooth® Interface 412; and Network Communication Interface 414, which enables the player terminal to communicate by transmitting and receiving wireless signals using licensed, semi-licensed or unlicensed spectrums over a telecommunications network), audio interface 416, microphone 418, display 420, keypad or keyboard 422, SIM card 424, other input and/or output interfaces 426, and gaming module 428. The various components of a mobile device may be interconnected via a bus.

Memory 402 can be any device, mechanism, or populated data structure used for storing information. In accordance with some embodiments of the present technology, memory 402 can encompass any type of, but is not limited to, volatile memory, nonvolatile memory and dynamic memory. For example, memory 402 can be random access memory, memory storage devices, optical memory devices, media magnetic media, floppy disks, magnetic tapes, hard drives, SDRAM, RDRAM, DDR RAM, erasable programmable read-only memories (EPROMs), electrically erasable programmable read-only memories (EEPROMs), compact disks, DVDs, and/or the like. In accordance with some embodiments, memory 402 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 402.

Memory 402 may be used to store instructions for running one or more applications or modules on processor(s) 404. For example, memory 402 could be used in one or more embodiments to house all or some of the instructions needed to execute the functionality of the various system components and/or modules. Processor(s) 404 are the main processors of player terminal 122 which may include application processors, baseband processors, various coprocessors, and other dedicated processors for operating player terminal 122. For example, an application processor can provide the processing power to support software applications, memory management, graphics processing, and multimedia. An application processor may be communicably coupled with memory 402 and configured to run the operating system 408, the user interface, and the applications stored on memory 402 or data storage component 410. A baseband processor may be configured to perform signal processing and implement/manage real-time radio transmission operations of a player terminal (e.g., a mobile device). These processors, along with the other components, may be powered by power supply 406. The volatile and nonvolatile memories found in various embodiments may include storage media for storing information such as processor-readable instructions, data structures, program modules, or other data. Some examples of information that may be stored include basic input/output systems (BIOS), operating systems, and applications.

Operating system 408 can also provide common services for software applications running on processor(s) 404. According to the embodiments shown in FIG. 4, gaming module 428 can include identification module 430, policy enforcement module 432, payout adjustment module 434, skill level adjustment module 436, accounting module 438, and state recordation module 440. Each of these modules can be embodied as special-purpose hardware (e.g., one or more ASICS, PLDs, FPGAs, or the like), or as programmable circuitry (e.g., one or more microprocessors, microcontrollers, or the like) appropriately programmed with software and/or firmware, or as a combination of special purpose hardware and programmable circuitry. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, identification module 430 and policy enforcement module 432 can be combined into a single module for identifying and enforcing various policies on a player terminal.

Identification module 430 can be used to gather information about the player terminal, current and/or past gaming sessions, player information, specific hardware and software configurations of the player terminal, GPS coordinates, associated telephone numbers, IP addresses, e-mail addresses, user identifiers, international mobile station equipment identity (IMEI), mobile equipment identifiers (MEID), integrated circuit card identifiers (ICCID), part identifiers, software identifiers, current gaming session identifiers, identification of any nearby player terminals, and the like. This information can be used in a variety of ways, including by policy enforcement module 432 which can set customized collusion avoidance policies that can, in some embodiments, be dynamically set (e.g., based on location, current gaming session, etc.).

Payout adjustment module 434 can be used to dynamically adjust the payout of a gaming session. For example, there may be minimum payout requirements (e.g., between 85% and 98%) that are required to be met over a period of time (e.g., daily, weekly, monthly, and yearly). As such, the payout module can ensure those minimum requirements are met. Payout adjustment module 434 may also be able to adjust the payout based on the profit model being used for a particular gaming session. For example, some games may take a fee or percentage off the top, a rake (e.g., 1% to 15%, fifty cents, one dollar, etc.) of the money at play. As another example, the games may use a pooled liquidity model for jackpots where the money is derived from multiple sources (e.g., multiple casinos). As such, the percentage may be different depending on the game play location or other factor. Still yet, payout adjustment module 434 may be connected to a casino or other rewards system and grant higher payouts based on various reward models (e.g., number of visits, average bet, total money bet, holiday/birthday month, gift, etc.).

Skill level adjustment module 436 can be used to adjust playing parameters within the game. Examples of playing parameters can include, but are not limited to, number of lives, amount of time to complete an objective, game speed, amount of ammo, firing rates, items caught, items chosen, number of automated opponents, automated opponent strengths, and the like. The higher the skill level set by skill level adjustment module 436, the higher the payout. Accounting module 438 can be used to interface with various existing backend accounting systems and other reporting and record keeping systems (e.g., IRS reporting systems). In some embodiments, accounting module 438 may be used to implement procedures that are designed to detect and prevent transactions that may be associated with money laundering, fraud and other criminal activities and to ensure compliance with all federal laws related to money laundering.

State recordation module 440 can be used to capture the state of the gaming session. This can include a variety of game states including, but not limited to, wager, payout levels, skill level settings, and others. The state of the gaming session can be repeatedly captured so that in the event of a communication failure, terminal fault, or other issue that would prevent the gaming session from being completed a record of the current state can be reconstructed. For example, in some embodiments, the state may be captured at least every second. In other embodiments, the state may be captured more or less quickly depending on game dynamics. The state captured by state recordation module 440 may also be used (possibly with state information from other player terminals of the same gaming session) by a collusion avoidance module to determine if any collusion is occurring. In some embodiments, the state information captured by state recordation module 440 can be used to generate various gaming analytics. In some embodiments, the host computer (or gaming platform) may capture the snapshots of the state information directly.

State recordation module 440 may store the state information in database for regulatory compliance, analytics, or other purpose. For example, in some embodiments, all the game play within a period of time (e.g., a five year period, a two year period, a year, a month, a week, a day, etc.) could be recorded and stored in the database. In other embodiments, a limited number of gaming sessions could be recorded (e.g., last one hundred, last thirty, etc.). Still yet, some embodiments of state recordation module 440 may only record (or record for longer period of time) games that have betting above a set threshold (e.g., $500, $1000, etc.).

The state information recorded by state recordation module may be a direct copy of the game play or only information sufficient to reproduce the game play. For example, in some embodiments, the state information may include various gaming parameters (e.g., ammo amounts, number of lives, level, etc.), gaming session identifier, date and time the interactive gaming session is opened or terminated, the date and time the interactive gaming session is logged in to or is logged out of by various player terminals, the physical location, by state or foreign jurisdiction, of the authorized player while logged in to the interactive gaming account, and/or other types of information.

In some embodiments, the player terminals can provide for social media, chatting and other communication channels. For example, some embodiments, may have interfaces that allow for third party access through another gateway like Facebook® or other social media. Some embodiments of the player terminals may allow for picture in picture or multiple screens. For example, players may be able to play an interactive game via one screen or video channel and in the second screen or video channel being displayed in the picture in picture (PIP) thereby allowing players to play more than one at a time. The additional screens or video channel, for example, could be used to watch sports, fantasy sports betting, ordering drinks or food, and the like. In some embodiments, additional screens may be present to present various promotions such as ticket sells for shows, restaurant deals, future room bookings, room upgrades, and the like.

Some embodiments of the player terminals may also include external video outputs that allow for display of the game by others. For example, in various tournament play (e.g., eSports), the external video outputs may allow others to watch the game play. In various embodiments, the player terminals may support virtual reality interfaces, hologram generation systems, and other visualizations system for the gaming. The player terminals, in some embodiments, can include various sensors to detect gestures that can be interpreted as controls for betting, controlling gaming action, ordering drinks, etc.

Figure 5:
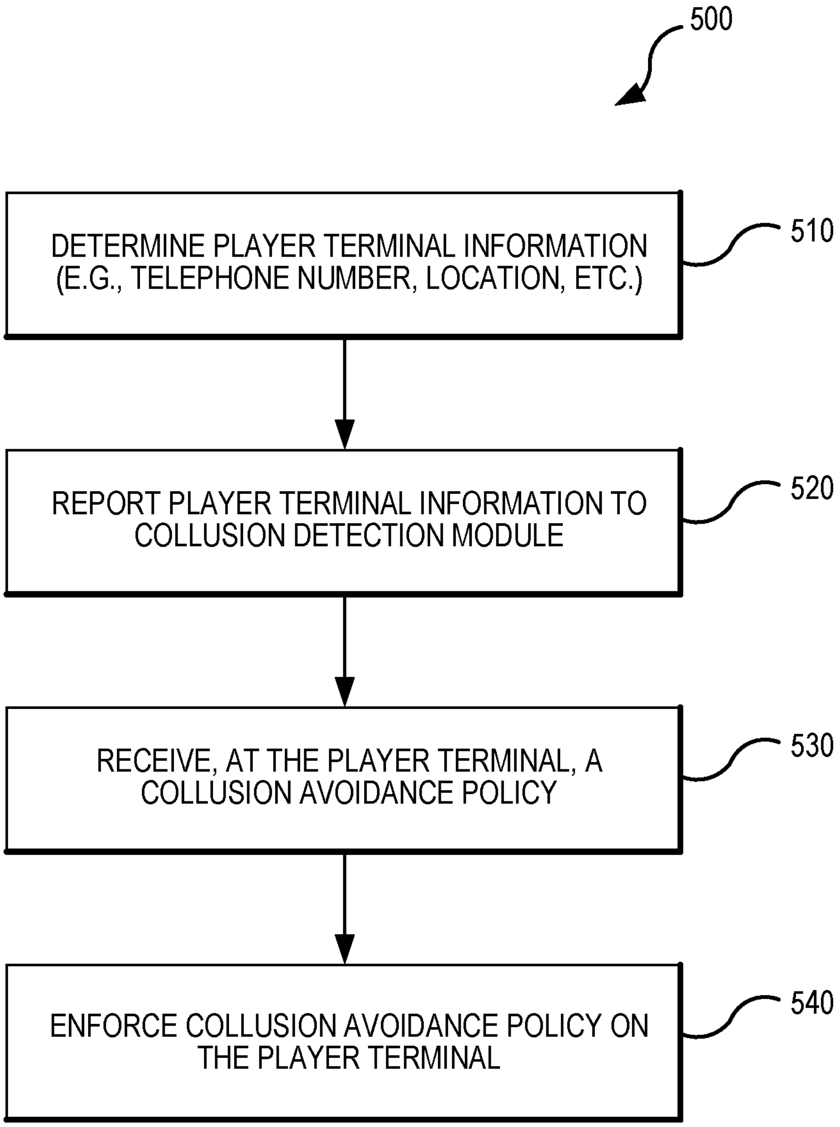
FIG. 5 illustrates an example of a set of operations for enforcing a collusion avoidance policy on a player terminal in accordance with various embodiments of the present technology.

FIG. 5 illustrates an example of a set of operations 500 for enforcing a collusion avoidance policy on a player terminal in accordance with various embodiments of the present technology. Various embodiments of the present technology allow for heterogeneous player terminals that can be at either fixed locations or mobile (i.e., able to move to different locations). Since the player terminals may have different capabilities and may even be owned and operated by a player (e.g., a tablet), each player terminal may need different and/or dynamically changing collusion avoidance policies. For example, a player terminal that is mobile may be able to be positioned nearby (e.g., within 25 feet) of a second player terminal that is stationary. As such, the collusion avoidance policies may need to be dynamically updated so that those player terminals may not participate in the same gaming session. In some instances, for example in various eSports events and other team based gaming session, the collusion avoidance policies may allow multiple players to collude. As such, this type of dynamic policy adjustment can allow, in some embodiments, the collusion detection and enforcement to be appropriately set or even completely disengaged.

As illustrated in FIG. 5, for example, collection operation 510 determines the player terminal information. Player terminal information can include information regarding specific hardware and software configurations of the player terminal. In some embodiments, the player terminal information can include player information collected via the player terminal. In accordance with various embodiments, and depending on the type of player terminal, collecting the player terminal information can be done in a variety of ways. For example, the player terminal information could be automatically collected by accessing various sensors, components, operating systems, and/or software associated with the player terminal. In some embodiments, the player terminal location maybe monitored over long periods of time and predictive analytics or learning algorithms can be used to generate a likely current location for the player based on historical information.

In some embodiments, the player terminal information could include GPS coordinates, telephone numbers, IP addresses, e-mail addresses, user identifiers, international mobile station equipment identity (IMEI), mobile equipment identifiers (MEID), integrated circuit card identifiers (ICCID), part identifiers, software identifiers, current gaming session identifiers, identification of any nearby player terminals, and the like. As another example, management software or gaming software loaded on the player terminal may send out or monitor for beacon signals (e.g., using Bluetooth® or other short range communication protocols) that can be received or transmitted by monitoring stations located at various physical locations (e.g., at a casino, airport, etc.).

The player terminal information can be reported, during reporting operation 520, to a collusion detection module. The collusion detection module may be part of the player terminal or separate from the player terminal. Reporting operation 520 may stream the information to the collusion detection module or send the information in batches. As the player terminal information changes, the changes can be detected and then sent to the collusion detection module. This may be particularly helpful in reducing traffic between the player terminal and a separate collusion module. The collusion detection module can then process the player terminal information along with other information such as, for example, collusion rules to develop a collusion avoidance policy. Once the player terminal information is received during receiving operation 530, the player terminal can enforce the collusion avoidance policy on the player terminal during enforcement operation 540.

Figure 6:
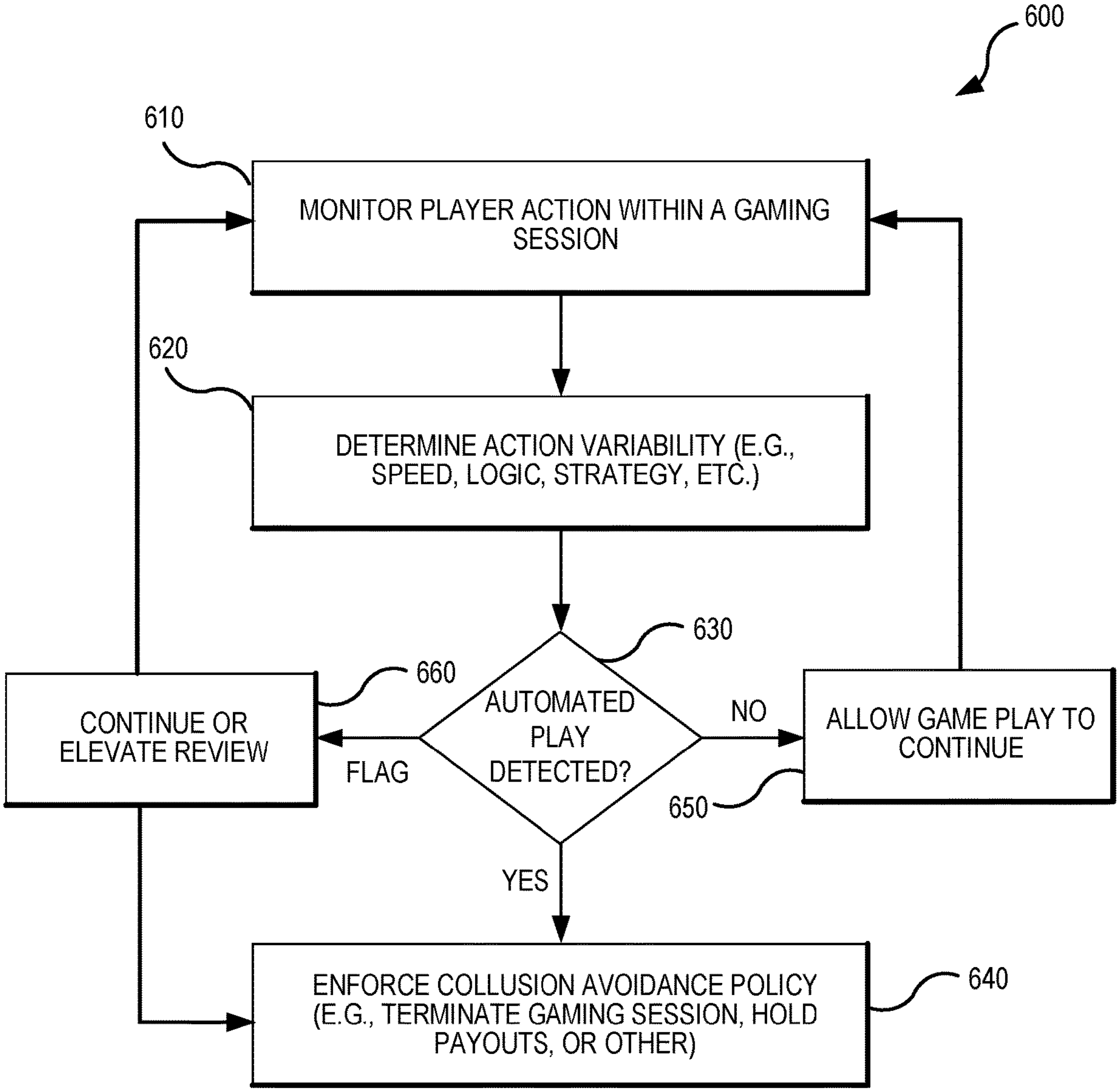
FIG. 6 illustrates an example of a set of operations for detecting automated play on a player terminal in accordance with one or more embodiments of the present technology.

FIG. 6 illustrates an example of a set of operations 600 for detecting automated play on a player terminal in accordance with one or more embodiments of the present technology. As illustrated in FIG. 6, monitoring operation 610 can monitor player action within a gaming session. Using the player action, determination operation 620 determines action variability. For example, the variability in responding to various game play situations, the player's logic in responding to various game play situations, the player's strategy, the player's response time for responding to various game play situations, the player's betting patterns, and/or other information derivable from monitoring player actions. In some embodiments, determination operation 620 may also monitor various biometrics of the player or record the player with a camera.

Using the action variability, determination operation 630 can determine if a player terminal is using automated play during the gaming session. This may be a score, a percentile, confidence level, a range, or other indicator that automated play is likely occurring. If determination operation 630 determines that automated play is occurring (or likely occurring), then determination operation 630 branches to enforcement operation 640. During enforcement operation 640, the collusion avoidance policy can be enforced and may include a variety of actions including, but not limited to holding the game, terminating gaming sessions, holding payouts subject to further review, initiating review of other available data (e.g., from video surveillance systems), creating entries in a user tracking system and the like. The collusion avoidance policy may have variable enforcement depending on the confidence or likelihood of the automated play, the betting amount, the identity of the player, the number of auto play triggers for the identified player, and the like. Such features may be manually engaged or disengaged by the operators or be associated with a set of rules that can allow the system to automatically engage or disengage the feature in some embodiments.

If determination operation 630 determines that automated play is not occurring (or not likely occurring), then determination operation 630 branches to allowance operation 650, which allows the game play to continue and returns to monitoring operation 610 where the player action within a gaming session is monitored. If determination operation 630 flags the play as potentially automated, then determination operation 630 branches to review operation 660 which can allow the game to continue with a heightened level of review or elevate the review to other systems or gaming administrators for review. During this time, the game may be allowed to continue to collect additional evidence with monitoring operation 610 or a collusion avoidance policy may be enforced with enforcement operation 640. The collusion avoidance policy may request that an additional game be played where the gaming action is varied (e.g., speed, difficulty level, etc.) to determine if automated playing is occurring.

Figure 7:
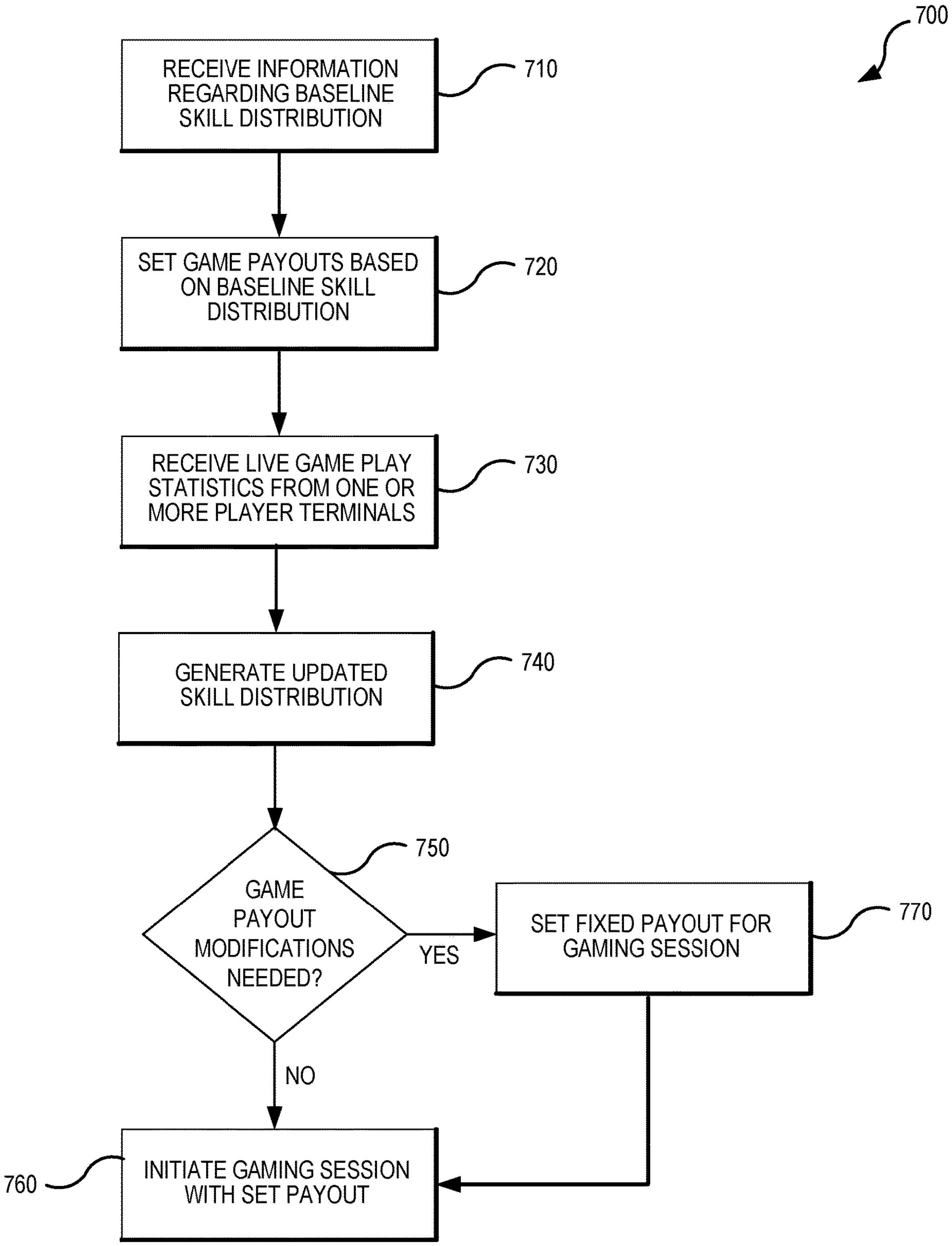
FIG. 7 illustrates an example of a set of operations for setting and updating a gaming session payout on a player terminal in accordance with some embodiments of the present technology.

FIG. 7 illustrates an example of a set of operations 700 for setting and updating a gaming session payout on a player terminal in accordance with some embodiments of the present technology. As illustrated in FIG. 7, receiving operation 710 receives information regarding a baseline skill distribution for one or more interactive games (e.g., Pac-Man, Tetris, etc.). This baseline may be collected offline or via terminals over a period of time. Using the baseline skill distribution, payout operation 720 sets the initial game payout based on the baseline skill distribution. As players play the interactive games, additional live game play statistics can be received from one or more terminals during playing operation 730. The skill distribution can be updated based on the additional live game play statistics during update operation 740. Using the updated skill distribution, determination operation 750 can determine if a game payout modification is needed. If determination operation 750 determines that a game payout modification is not needed, then determination operation 750 can branch to initiation operation 760 to initiate a gaming session with a set payout. If determination operation 750 determines that a game payout modification is needed, the determination operation 750 can branch to setting operation 770 where a fixed payout for a gaming session is updated and set. Once the payout is set, then the gaming session can be initiated from initiation operation 760.

Figure 8:
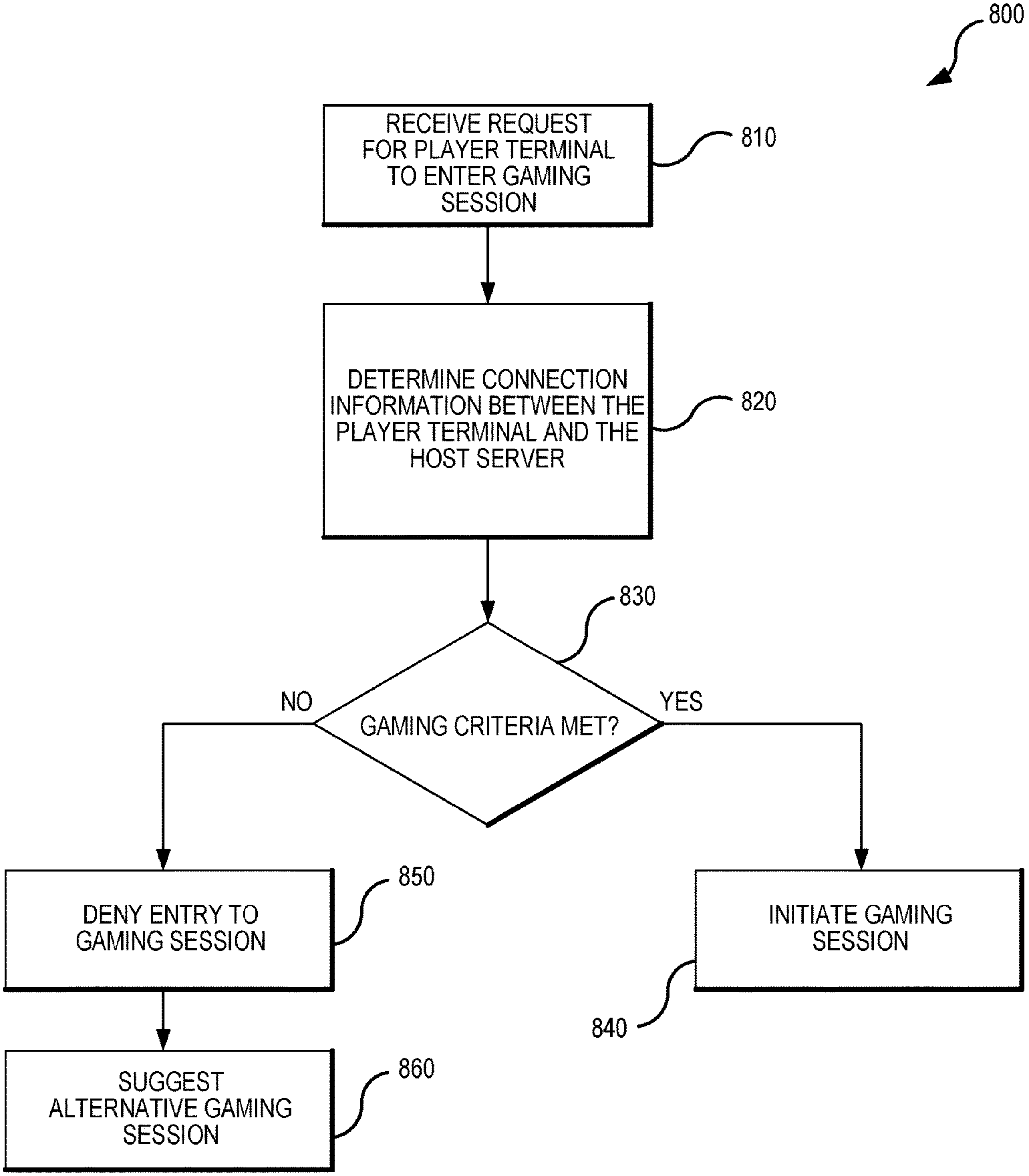
FIG. 8 illustrates an example of a set of operations for determining if network connection is sufficient for allowing a gaming session according to various embodiments of the present technology.

FIG. 8 illustrates an example of a set of operations 800 for determining if network connection is sufficient for allowing a gaming session according to various embodiments of the present technology. As illustrated in FIG. 8, receiving operation 810 can receive a request for a player terminal to enter a gaming session. Connection operation 820 can determine the connection information between the player terminal and the host server. The connection information may include information such as, but not limited to, upload speeds, download speeds, connection type (e.g., fiber/cat-5, WiFi, cellular, miracast etc.), and other connection information. Using the connection information, determination operation 830 can determine whether the gaming criteria is met. For example, the gaming criteria can include minimum upload speeds, minimum download speeds, and the like. If determination operation 830 determines the gaming criteria has been met, then determination operation 830 can branch to initiation operation 840 where the gaming session can be initiated. If determination operation 830 determines the gaming criteria has not been met, then determination operation 830 can branch to denial operation 850 where a gaming session is not initiated and then suggestion operation 860 can be used to suggest an alternative game based on the connection information.

Figure 9A:
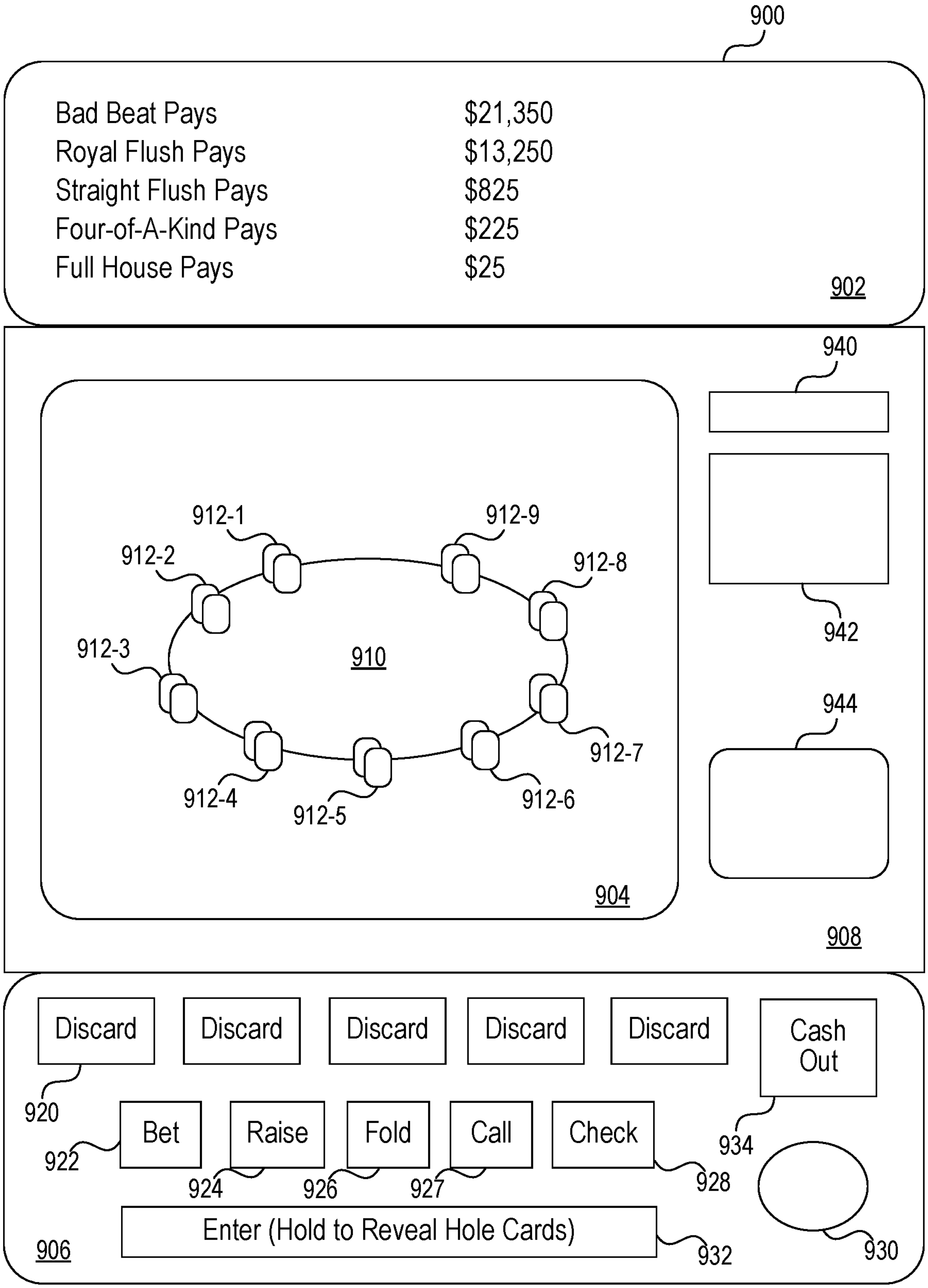
FIGS. 9A-9B illustrate examples of a player terminal according to one or more embodiments of the present technology.
Figure 9B:
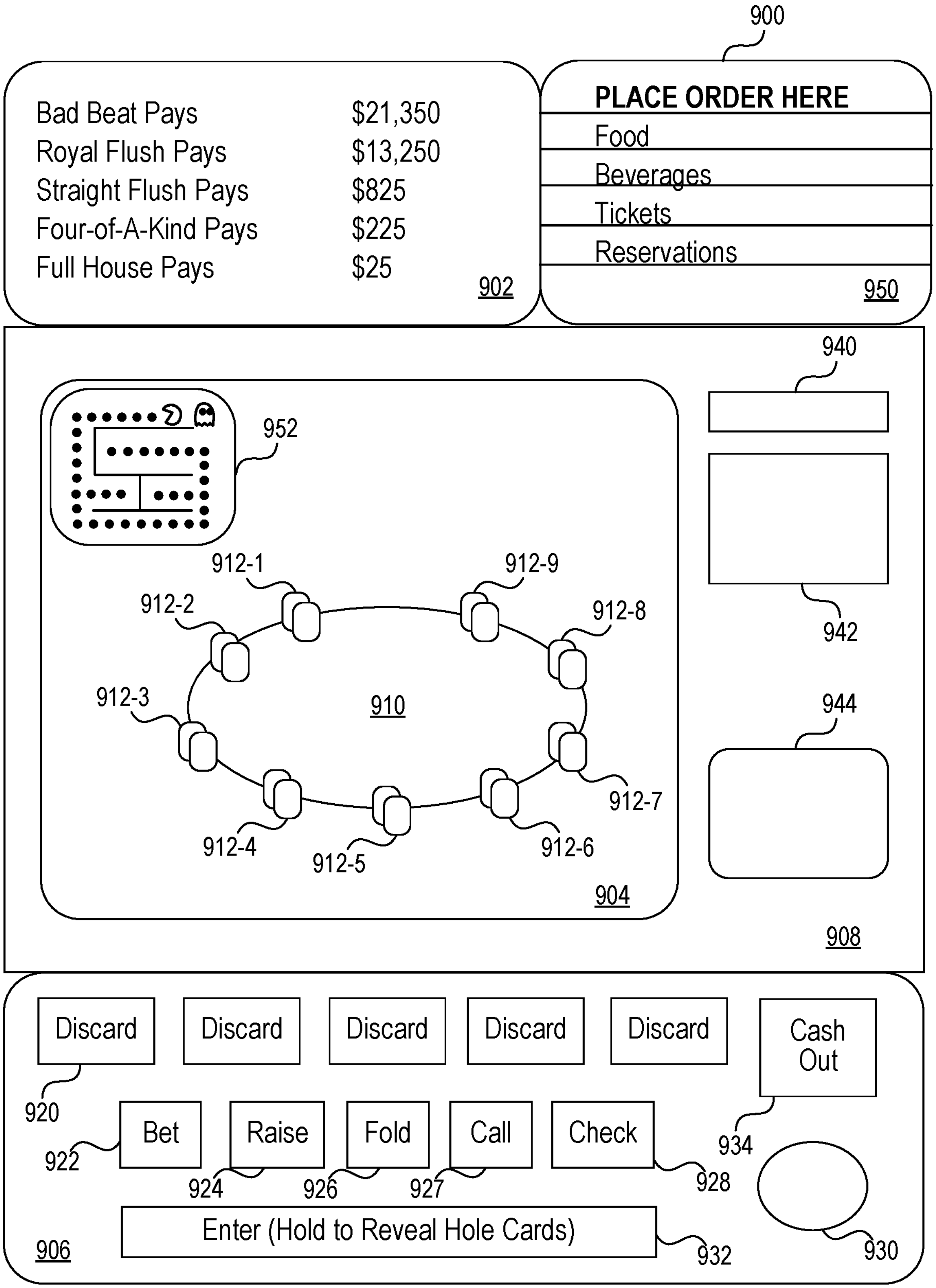

FIGS. 9A-9B illustrate examples of player terminal 900 according to embodiments of the technology. Only the most relevant aspects of the user interface portion of the player terminal 900 are illustrated and described herein. It should be apparent that the user interface may be part of a hand-held player terminal, a free standing player terminal (e.g., a tabletop gaming console, a dedicated gaming enclosure with electronics supporting the game, etc.), a computing device configured as a player terminal (e.g., a laptop, mobile phone, tablet, e-reader, etc.), a "set-top" gaming console, and/or the like. Further, it is not necessary for all elements of the player terminal illustrated and described herein to be included in the player terminal.

The terminal includes a jackpot payout information area 902, a game display area 904, a player interaction area 906, and a cash and credit interaction area 908. The jackpot payout information area 902 includes information about the status of jackpot accumulations. The amounts associated with the various jackpots may increase with time and may be game specific. For example, if the player terminal provides the possibility to engage in different types of games and limits, then the jackpot amounts displayed in the jackpot information area may change with different player game selections.

The game display area 904 provides a visual depiction of the game in which the player is involved. For example, the game display area 904 may show a poker table 910 and players 912 sitting around the table. As players are dealt cards, the cards may appear in front of each player. As players bet, chips may be displayed in front of the players. At the end of each betting round, the chips from the round may be scooped into the middle of the table to symbolize the pot for which the players are competing. As the action proceeds around the table, the next player to act may be highlighted and that player's terminal may beep, or otherwise alert the player that it is his turn to act. Community cards may appear on the table for all players to see. At the conclusion of the hand, the pot may be pushed to the winning player as the hole cards of all players still in the hand are revealed. Each player's present bankroll may be graphically or numerically displayed so that all players know how much each player has available to wager.

The game display area 904 may be where players look to view their hole cards. A player's hole cards may be continuously displayed. In some embodiments, however, steps are taken to help ensure a player's hole cards remain hidden from other players potentially playing at nearby terminals to thereby prevent cheating. In some embodiments, a button is included (e.g., the enter button 932) that causes the hole cards to be revealed. If the button is not depressed, then the hole cards are simply shown as face down. This way, players can quickly glance at their cards thereby reducing the risk that someone else can view their hole cards. In other embodiments, hole cards may be displayed on a separate display screen. In either case, shielding, glass coatings, polarization screens, and/or the like may be employed to prevent others from viewing a player's hole cards.

The player interaction area 906 includes player buttons, input devices, and the like through which players interact with the game. It should be appreciated that the player interaction area 906 may comprise touch screen buttons on the game display area 904. Hence, it should be understood that this embodiment is merely exemplary of a number of possible embodiments as will be appreciated by those skilled in the art.

The player interaction area 906 in this embodiment includes discard buttons 920 for draw games (e.g., 5-card draw, 2-7 triple draw lowball, etc.). Players use these buttons to identify cards to be discarded in a drawing round. The player interaction area 906 also includes a bet button 922, a raise button 924, a fold button 926, a call button 927, and a check button 928. These buttons are used to take the appropriate action according to each button's name. In some embodiments, additional input buttons and devices are included. For example, a track ball 930 may be included for indicating how much a player wants to bet in unstructured games. It also may be used to select from several choices displayed on the display screen 904. It may be used in combination with the enter button 932 to confirm a selection. A cash out button 934 allows a player to leave a game with the value the player has presently accumulated. Those skilled in the art will appreciate many other possibilities in light of this disclosure. For example, depending on the type of game play contemplated, the player interaction area could include other types of input devices to accept inputs. These input devices can include, but are not limited to voice recognition, actuators, joysticks, 3D-image tracking systems to monitor player motions, and the like.

The cash and credit interaction area 908 provides a loyalty card accepter 940, a bill or ticket accepter/dispenser 942, and a coin dispenser 944. These items work in ways similar to analogous devices on, for example, video poker machines, except that the player terminal sends signals to the host computer system in response to player actions taken with respect to cashing in and out. As illustrated in FIG. 9B, some embodiments of player terminal 900 may include at least one additional interactive display 950 that allows the player to place orders for various items (e.g., for food orders, beverage orders, ticket orders, reservations, etc.). These orders for various items can be transmitted from player terminal 900 to a fulfillment system (not shown). In some embodiments, additional display 950 can also allow the player to play slots, place bets on sporting events, or place bets on fantasy sporting events simultaneously with the interactive gaming session. Various embodiments of player terminal 900 may also include a picture in picture capability 952 capable of presenting game play from other players, a second interactive gaming sessions that the player terminal has joined, advertisements, sporting events, and the like.

Those skilled in the art will appreciate that the foregoing description is merely exemplary of a number of possible player terminal embodiments. For example, other embodiments may include all touch screen controls, may only accept bills and dispense tickets, may not include jackpot values, and the like. Most embodiments, however, minimally include a display area through which the action is depicted and which may include player input buttons that change depending on the state of the game. It should also be appreciated that the display region may show display screens that allow players to select games and limits, enter personal information, if desired, and advertise promotions and the like when the terminal is not in use. Many other possibilities exist and are apparent to those skilled in the art in light of this disclosure.

Figure 10:
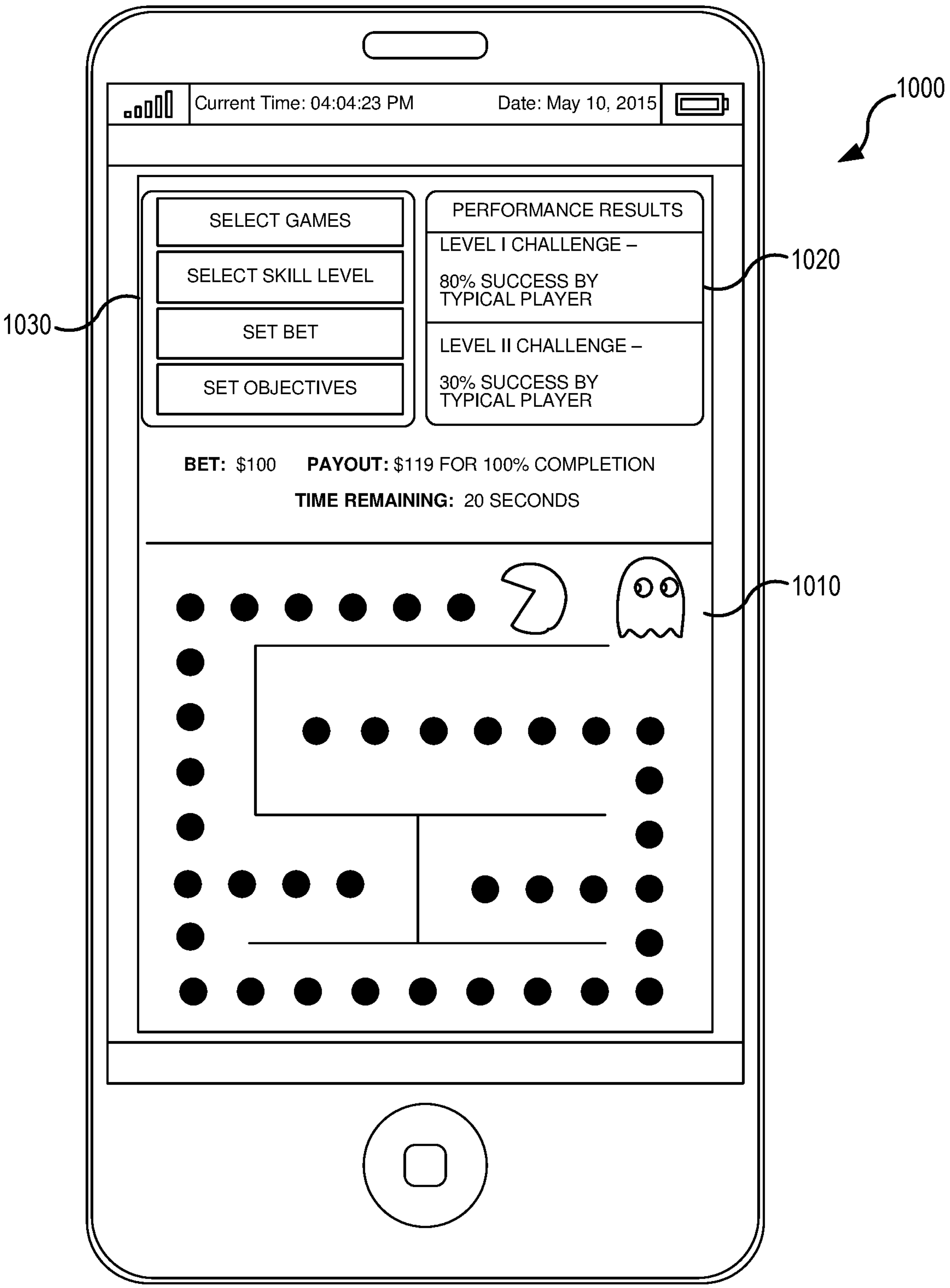
FIG. 10 illustrates an example of a player terminal according to some embodiments of the present technology.

FIG. 10 illustrates an example of a player terminal 1000 according to some embodiments of the present technology. As illustrated in player terminal 1000, there may be a player interaction area 1010 where the interactive game is presented. The performance area 1020 can show various challenge levels, typical success rates, payouts, and other information. Game selection area 1030 may be used to select the one or more games being played, the skill level, bets, and objectives for winning.

Figure 11:
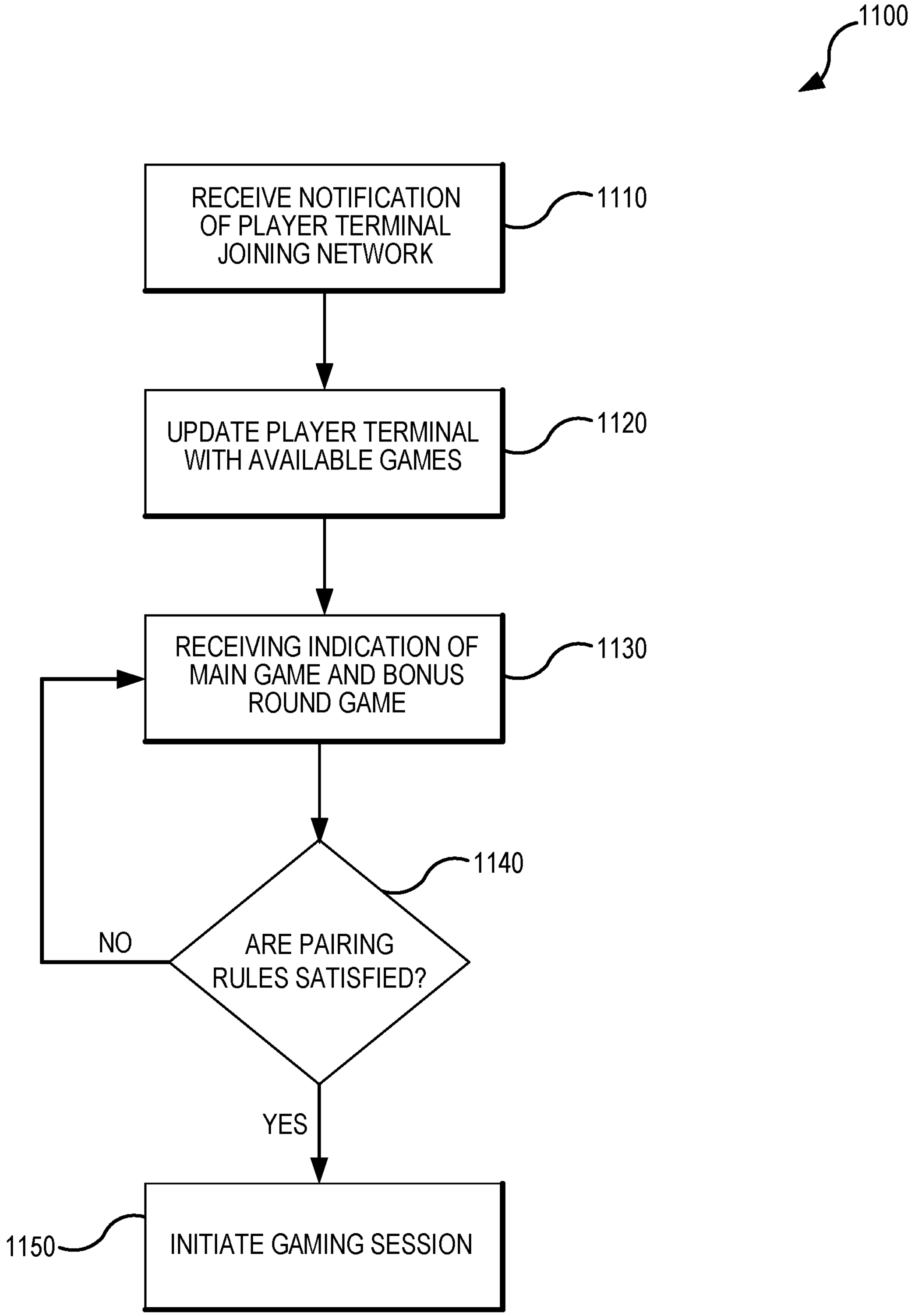
FIG. 11 illustrates an example of a set of operations for selecting game play within a gaming session according to various embodiments of the present technology.

FIG. 11 illustrates an example of a set of operations 1100 for selecting game play within a gaming session according to various embodiments of the present technology. While some terminals may be fixed and generally available for play, other player terminals may be personal computing devices of the player. As such, receiving operation 1110 can receive a notification that a player terminal has joined the network. Using update operation 1120, the player terminal can be updated with the available games or a list of the available games. The player can be presented with an opportunity to select a plurality of games for play. For example, during selection operation 1130, an indication can be received indicating the main game and the bonus round game that the player would like to combine.

Some embodiments set various rules for how the games may be paired. For example, one rule may require that at least one of the games is an interactive game. As another example, the rules may seek to limit or minimize the average estimated play time. As such, only those games with average game play below a particular threshold may be presented as pairing options once the first game has been selected. Determination operation 1140 can determine if the pairing rules have been satisfied. If determination operation determines that the pair rules have not been satisfied, then determination operation 1140 branches to selection operation 1130 where different selections can be made. If determination operation determines that the pair rules have been satisfied, then determination operation 1140 branches to initiation operation 1150 where the gaming session is initiated.

Figure 12:
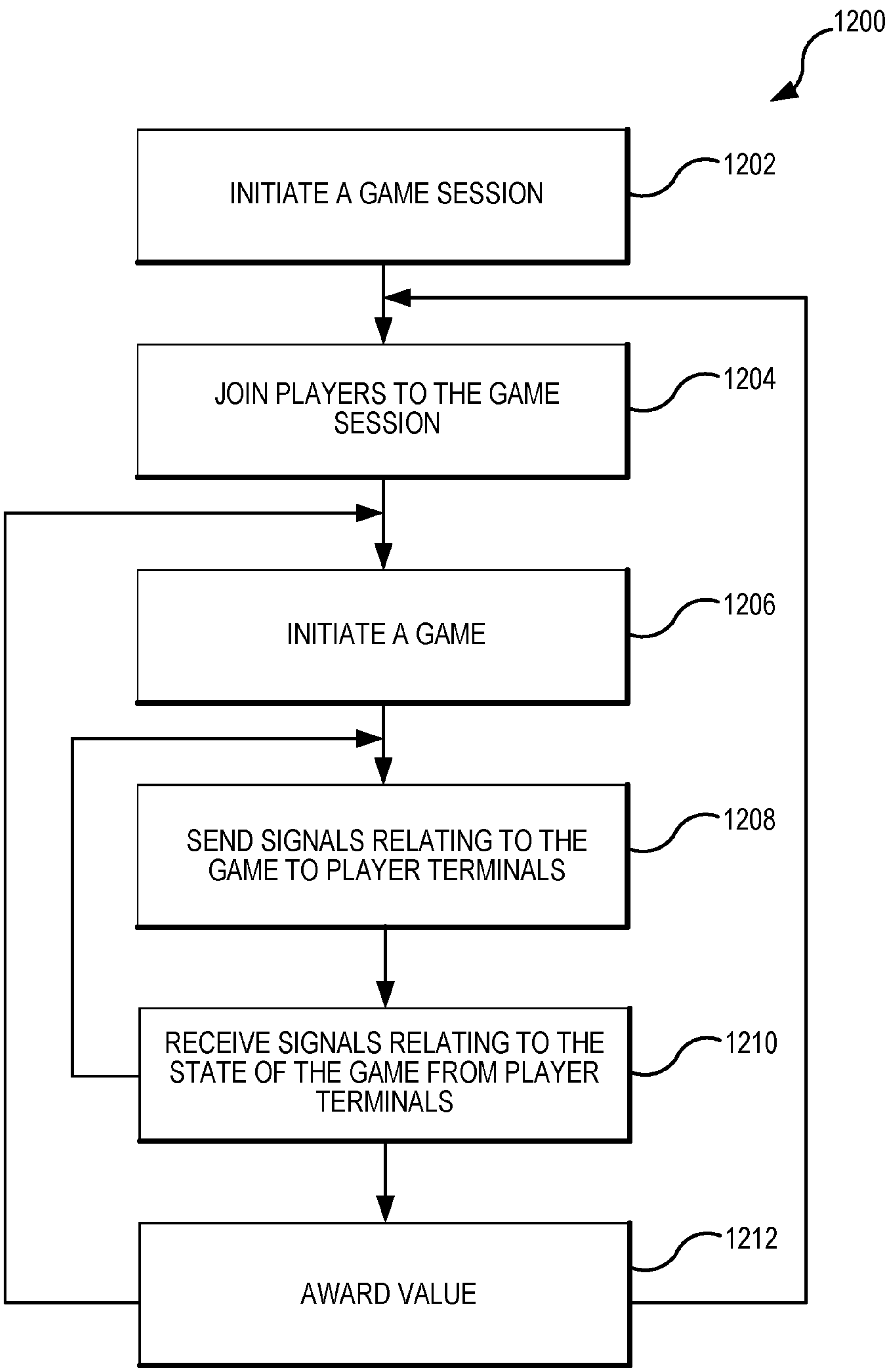
FIG. 12 illustrates an example of a set of operations for operating an interactive game according to one or more embodiments of the present technology.

FIG. 12 illustrates an example of a set of operations 1200 for operating an interactive game according to one or more embodiments of the present technology. The method may be implemented in gaming network 100 of FIG. 1 or other appropriate system. Those skilled in the art will appreciate that other exemplary embodiments may include more, fewer, or different steps than those illustrated and described here. Further, other exemplary embodiments may traverse the steps in different orders than shown herein.

The set of operations 1200 begins at block 1202 at which a host computer system, such as the host computer system 102, initiates a game session. A game session, could be, for example, a poker game among several players. The game session could consist of one or more hands of poker in which players compete against one another for the pot. The game session could be a series of blackjack hands in which one or more players compete against the house as is known in the art. The game session also could be a series of hands of other games such as gin rummy, bridge, and the like. As another example, the game session could be any type of interactive game such as a game of skill, game of chance, or a hybrid game that includes a game of skill and a game of chance as regular game play or in a bonus.

In some embodiments, initiating a game session comprises making a selection available on one or more player terminals. The selection allows players at the player terminals to enter the game session. Any number of game sessions could be available at any given time for players to enter. The games may comprise a variety of games (e.g., Texas Hold'em, 7-Card Stud, Omaha, Draw poker, 2-7 lowball, Blackjack, Bridge, pinball, Grand Theft Auto, Tetris, Minecraft, Hearthstone, Super Mario, Super Mario Kart, Pac-Man, Guitar Hero, Galaga, League of Legends, Frogger, StarCraft, Donkey Kong, words with friends, Sonic the Hedgehog, Counter-Strike, Metroid, Ms. Pac-Man, Space Invaders, Punch-Out, Rainbow Six Seige, Fallout, Final Fantasy, Call of Duty, Street Fighter, Dota, Journey, Dark Souls, etc.) and a variety of limits ($0.25/$0.50, $11$2, $11$2 Blind No Limit, $10/$20, $500/$1000, etc.). In some embodiments, the players may be able to select the game played in the gaming session and a game of skill to be played in the bonus round. In some embodiments, the game session may be a tournament, which may be a single-table tournament or a multi-table tournament.

At block 1204, players are joined to the game session. This may comprise receiving a signal from a player terminal that the player desires to enter the game and has deposited sufficient funds to enter the game. The player is assigned to a seat (or is allowed to select a seat) at a virtual table, which may be displayed as shown in FIGS. 9A-9B. The player's bankroll (i.e., the player's stake in the game) may be depicted at the virtual table.

In some embodiments, players may be provided with an option to change their perspective of the virtual table. For example, a player may desire to "sit" at the bottom of the table in the seat identified as 912-5 in FIGS. 9A-9B. If the player is seated in a different seat, the player may elect to "rotate" the perspective of the table so that the player is depicted in the desired position. This does not change the player's position at the table with respect to the other players; it merely changes the player's perspective for display purposes. This option may be useful in reducing cheating, since the player may relocate his position at the table to a position that obstructs the view of a potential cheater located near the player's terminal. Of course, a player my elect to take a different seat at the table in some embodiments.

In some embodiments, players are randomly assigned to a game session. While a player may identify the game and what limit the player wants to play, the table to which the player is assigned is not up to the player. This minimizes the chance that a group of colluding players are able to sit at the same table. Of course, a player can always request a table change or leave the game entirely.

In some embodiments, players enter a waiting list for certain games and limits. If, for example, all the seats at a desired table are taken, a player may request to be placed on a waiting list for that game. Players may enter waiting lists for specific games and/or limits. When a seat opens in a game session that corresponds to the list in which a player is waiting at the top of the list, the player is given the opportunity to enter the game session.

As described previously, collusion or other forms of cheating may be addressed by prohibiting players from engaging in the same game session from locations proximate one another. For example, if a casino has a plurality of player terminals distributed throughout the casino, then players may be prevented from joining the same game session from neighboring terminals. After a player joins a game session from a specific terminal, nearby terminals are "locked out" of that game session. The same process may be followed at all locations. If players are playing from wireless terminals, the wireless terminals may have proximity detection features that perform a similar function of locking out nearby terminals. Many other possibilities exist. In some embodiments, all or certain players may be permitted to communicate and collude during an interactive gamine session (e.g., in eSports or other team-based gaming). As such, some embodiments allow for the collusion detection to be suspended during certain permitted game types or as selected by an operator.

Once a sufficient number of players are joined to a game session, a game, or hand, is initiated at block 1206. If, for example, the game is Texas Hold'em Poker, two cards are dealt to each player in the hand.

At block 1208, the game proceeds as is known in the art, with the host computer system sending signals to each player terminal indicating the state of the game. The player terminals provide a visual representation of the game state, and a player whose turn it is to act is provided with a set of options. Hence, play continues at block 1210 with the host computer system receiving signals indicating a player's action. The actions of blocks 1208 and 1210 continue with players interactively checking, betting, raising, calling, or folding and the host computer system updating the state of the game by sending signals to the player terminals. If the game limits are fixed, players merely need to indicate their selection for the action to proceed. If, however, the game is "no limit," "pot limit," or another non-structured betting limit, then players also indicate the size of each bet.

At block 1212, a winner is determined and the value of the pot is awarded to the winning player. A new game may then be initiated at block 1206. Since players are able to enter and leave game sessions at any time, new players may be joined at block 1204 to replace any players that leave the game session. While the foregoing description focuses on poker being played in the game session, those skilled in the art will appreciate that other forms of poker and other interactive games may be played according to other embodiments of the present technology.

Exemplary Computer System Overview

Aspects and implementations of the interactive gaming system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, cloud-based gaming platform or other computing device) programmed with the instructions to perform the steps or operations. For example, the steps or operations may be performed by a combination of hardware, software, and/or firmware.

Figure 13:
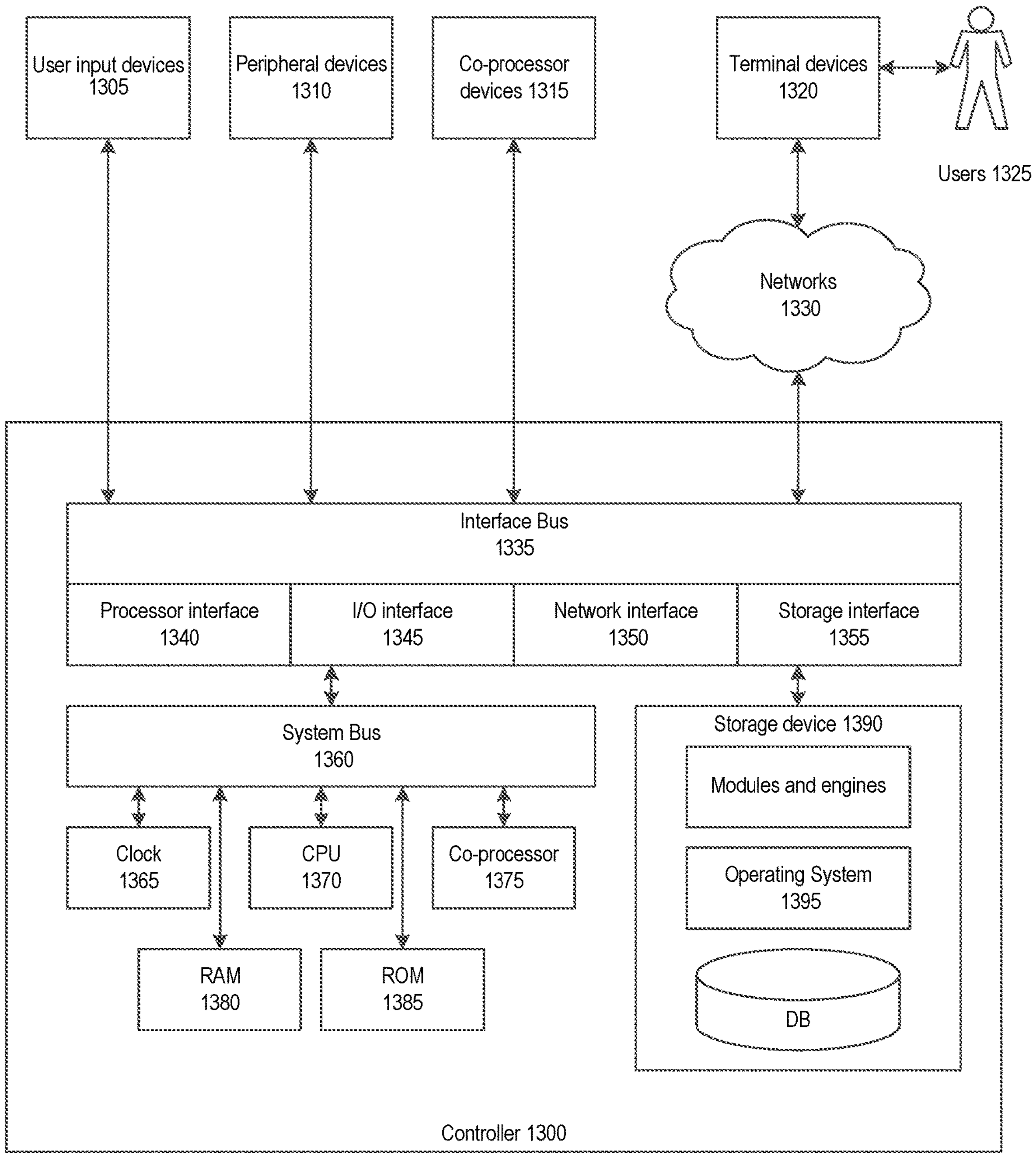
FIG. 13 illustrates an example of a computing platform that may be used in accordance with some embodiments of the present technology.

FIG. 13 is a block diagram illustrating an example machine representing the computer systemization of the host computer system. The gaming controller 1300 may be in communication with entities including one or more users 1325 client/terminal devices 1320 (e.g., devices 122), user input devices 1305, peripheral devices 1310, optional co-processor device(s) (e.g., cryptographic processor devices) 1315, and networks 1330 (e.g., 104 in FIG. 1). Users may engage with the gaming controller 1300 via terminal devices 1320 over networks 1330. In some embodiments, all or a portion of the communications between terminal devices 1320 and gaming controller 1300 can be encrypted. The law requires cryptography for some things.

Computers may employ central processing units (CPUs) or processors to process information. Processors may include programmable general-purpose or special-purpose microprocessors, programmable controllers, application-specific integrated circuits (ASICs), programmable logic devices (PLDs), embedded components, a combination of such devices and the like. Processors execute program components in response to user and/or system-generated requests. One or more of these components may be implemented in software, hardware or both hardware and software. Processors pass instructions (e.g., operational and data instructions) to enable various operations.

The gaming controller 1300 may include clock 1365, CPU 1370, memory such as read only memory (ROM) 1385 and random access memory (RAM) 1380 and co-processor 1375 among others. These controller components may be connected to a system bus 1360, and through the system bus 1360 to an interface bus 1335. Further, user input devices 1305, peripheral devices 1310, co-processor devices 1315, and the like, may be connected through the interface bus 1335 to the system bus 1360. The interface bus 1335 may be connected to a number of interface adapters such as processor interface 1340, input output interfaces (I/O) 1345, network interfaces 1350, storage interfaces 1355, and the like.

Processor interface 1340 may facilitate communication between co-processor devices 1315 and co-processor 1375. In one implementation, processor interface 1340 may expedite encryption and decryption of requests or data. Input output interfaces (I/O) 1345 facilitate communication between user input devices 1305, peripheral devices 1310, co-processor devices 1315, and/or the like and components of gaming controller 1300 using protocols such as those for handling audio, data, video interface, wireless transceivers, or the like (e.g., Bluetooth®, IEEE 1394a-b, serial, universal serial bus (USB), Digital Visual Interface (DVI), 802.11a/b/g/n/x, cellular, etc.). Network interfaces 1350 may be in communication with the network 1330. Through the network 1330, gaming controller 1300 may be accessible to remote terminal devices 1320 (e.g., player terminals 122 illustrated in FIG. 1). Network interfaces 1350 may use various wired and wireless connection protocols such as, direct connect, Ethernet, wireless connection such as IEEE 802.11a-x, miracast and the like. Some components of the interactive gaming system may include various protocols or comply with various standards or certifications set forth by different associations or regulatory agencies. For example, some embodiments may use the slot accounting system (SAS) protocol or comply with the game to system (G2S) standard.

Examples of network 1330 include the Internet, Local Area Network (LAN), Metropolitan Area Network (MAN), a Wide Area Network (WAN), wireless network (e.g., using Wireless Application Protocol WAP), a secured custom connection, and the like. The network interfaces 1350 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 1355 may be in communication with a number of storage devices such as, storage devices 1390, removable disc devices, and the like. The storage interfaces 1355 may use various connection protocols such as Serial Advanced Technology Attachment (SATA), IEEE 1394, Ethernet, Fiber, Universal Serial Bus (USB), and the like.

User input devices 1305 and peripheral devices 1310 may be connected to I/O interface 1345 and potentially other interfaces, buses and/or components. User input devices 1305 may include card readers, finger print readers, joysticks, keyboards, microphones, mouse, remote controls, retina readers, touch screens, sensors, and/or the like. Peripheral devices 1310 may include antenna, audio devices (e.g., microphone, speakers, etc.), cameras, external processors, communication devices, radio frequency identifiers (RFIDs), scanners, printers, storage devices, transceivers, and/or the like. Co-processor devices 1315 may be connected to the controller 1300 through interface bus 1335, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 1300 may employ various forms of memory including on-chip CPU memory (e.g., registers), RAM 1380, ROM 1385, and storage devices 1390. Storage devices 1390 may employ any number of tangible, non-transitory storage devices or systems such as fixed or removable magnetic disk drive, an optical drive, solid state memory devices and other processor-readable storage media. Computer-executable instructions stored in the memory may include an interactive gaming platform having one or more program modules such as routines, programs, objects, components, data structures, and so on that perform particular tasks or implement particular abstract data types. For example, the memory may contain operating system (OS) component 1395, modules and other components, database tables, and the like. These modules/components may be stored and accessed from the storage devices, including from external storage devices accessible through an interface bus 1335.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The gaming controller 1300 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the gaming controller 1300 may be distributed electronically over the Internet or over other networks (including wireless networks). Those skilled in the relevant art(s) will recognize that portions of the interactive gaming system may reside on a server computer, while corresponding portions reside on a client computer. Data structures and transmission of data particular to aspects of the gaming controller 1300 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

Having described several embodiments, it will be recognized by those of skill in the art that various modifications, alternative constructions, and equivalents may be used without departing from the spirit of the technology. Additionally, a number of well-known processes and elements have not been described in order to avoid unnecessarily obscuring the present technology. Accordingly, the above description should not be taken as limiting the scope of the technology, which is defined in the following claims.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A mobile player terminal for electronic gaming via the Internet, the mobile player terminal comprising:

one or more processors;

a display operably coupled to the one or more processors to depict action from an interactive electronic gaming session hosted by a host computer system;

a communications interface operably coupled to the one or more processors to establish communication via the Internet with the host computer system;

an interaction area operably coupled to the one or more processors to receive player interactions relating to game play by the player in the interactive electronic gaming session; and a memory operably coupled to the one or more processors, the memory having instructions stored thereon that when executed by the one or more processors cause the mobile player terminal to:

cause a list of multiple interactive electronic games available to a player using the mobile player terminal to be presented on the display;

monitor the interaction area for player interactions to detect a selection by the player of:

an interactive electronic game from the list for game play; and objectives that represent achievable goals during game play of the interactive electronic game;

after selection by the player of the interactive electronic game from the list, receive, via the communications interface and from one or more player terminals, information regarding a baseline skill distribution for one or more interactive games, wherein to receive the information regarding the baseline skill distribution, the instructions cause the mobile player terminal to collect the information regarding the baseline skill distribution offline or over a period of time from the one or more player terminals; and set an initial payout amount for the interactive electronic game based on the information regarding the baseline skill distribution;

adjust one or more gaming parameters for the interactive electronic game;

set a skill level of the interactive electronic game according to the one or more gaming parameters;

cause action from the interactive electronic gaming session of the interactive electronic game being played by the player to be presented on the display;

monitor the interactive electronic gaming session for completion of the objectives by the player after initiation of the interactive electronic game for play by the player;

receive, via the communications interface, live game play statistics from one or more additional player terminals operable by at least one other player participating in the interactive electronic gaming session;

update the information regarding the baseline skill distribution based on the live game play statistics; and determine a variable payout amount for the interactive electronic game based upon:

the skill level;

completion of the objectives by the player within the interactive electronic game; and the updated information regarding the baseline skill level distribution.

2. The mobile player terminal of claim 1, wherein the instructions when executed by the one or more processors further cause the mobile player terminal to generate a representation of the variable payback amount on the display.

3. The mobile player terminal of claim 1, wherein the instructions when executed by the one or more processors further cause the mobile player terminal to receive, from the host computer system and via the communications interface, the list of multiple interactive electronic games.

4. The mobile player terminal of claim 1, wherein the one or more gaming parameters include at least one of: ammo amounts, number of lives, level of the interactive electronic game, firing rate, number of automated opponents, automated opponent strength level, and an amount of time to complete the objectives.

5. The mobile player terminal of claim 1, wherein the objectives include one or more of: scoring a desired number of points, reaching a certain level, and completing one or more of the objectives within an amount of time, in the interactive electronic game.

6. The mobile player terminal of claim 1, wherein the mobile player terminal includes, or is connected to, a collusion avoidance module configured to:

monitor actions by at least one of the player and the at least one other player in the interactive electronic gaming session to detect a violation of a collusion avoidance policy for the interactive electronic gaming session; and initiate an action upon a violation of the collusion avoidance policy being detected, wherein the action includes holding payouts subject to further review.

7. The mobile player terminal of claim 6, wherein the action further includes initiation of a review of data collected from a video surveillance system.

8. The mobile player terminal of claim 1 further comprising at least one additional display, wherein the instructions when executed by the one or more processors further cause the mobile player terminal to allow, via the at least one additional display, the player to at least one of: play slots, place bets on sporting events, and place bets on fantasy sporting events, simultaneously with the interactive electronic gaming session.

9. The mobile player terminal of claim 1, wherein the instructions when executed by the one or more processors further cause the mobile player terminal to link multiple player terminals for head to head play within the interactive electronic gaming session.

10. A computer-implemented method in an electronic gaming system using the Internet, the method comprising:

establishing, using a communications interface, communication via the Internet between a mobile player terminal operable by a player and a host computer system hosting an interactive electronic gaming session;

causing a list of multiple interactive electronic games available to the player using the mobile player terminal to be presented on a display device of the mobile player terminal;

monitoring an interaction area of the mobile player terminal for player interactions to detect a selection by the player of:

an interactive electronic game from the list for game play; and objectives that represent achievable goals during game play of the interactive electronic game;

upon detecting the selection by the player of the interactive electronic game from the list, receiving, using the communications interface and from one or more player terminals, information regarding a baseline skill distribution for one or more interactive games, wherein receiving the information regarding the baseline skill distribution comprises collecting the information regarding the baseline skill distribution offline or over a period of time from the one or more player terminals; and setting an initial payout amount for the interactive electronic game based on the information regarding the baseline skill distribution;

adjusting one or more gaming parameters for the interactive electronic game;

setting a skill level of the interactive electronic game according to the one or more gaming parameters;

causing action from the interactive electronic gaming session of the interactive electronic game being played by the player to be presented on the display device;

monitoring the interactive electronic gaming session for completion of the objectives by the player after initiation of the interactive electronic game for play by the player;

receiving, using the communications interface, live game play statistics from one or more additional player terminals operable by at least one other player participating in the interactive electronic gaming session;

updating the information regarding the baseline skill distribution based on the live game play statistics; and determining a variable payout amount for the interactive electronic game selected based upon:

the skill level;

completion of the objectives by the player within the interactive electronic game; and the updated information regarding the baseline skill level distribution.

11. The method of claim 10 further comprising causing a representation of the variable payout amount to be presented on the display device.

12. The method of claim 10 further comprising receiving the list of multiple interactive electronic games from the host computer system hosting the interactive electronic gaming session.

13. The method of claim 10, wherein the one or more gaming parameters include at least one of: ammo amounts, number of lives, level of the interactive electronic game, firing rate, number of automated opponents, automated opponent strength level, and an amount of time to complete the objectives.

14. The method of claim 10, wherein the objectives include one or more of: scoring a desired number of points, reaching a certain level, and completing one or more of the objectives within an amount of time, in the interactive electronic game.

15. The method of claim 10 further comprising:

monitoring actions by at least one of the player and the at least one other player in the interactive electronic gaming session to detect a violation of a collusion avoidance policy for the interactive electronic gaming session; and initiating an action in response to detecting a violation of the collusion avoidance policy, wherein initiating the action includes holding payouts subject to further review.

16. The method of claim 15, wherein initiating the action further comprises initiating review of data collected from a video surveillance system.

17. The method of claim 10 further comprising linking multiple player terminals for head to head play within the interactive electronic gaming session.

18. One or more non-transitory computer readable media having instructions stored thereon that when executed by one or more processors cause a machine to:

establish, using a communications interface, communication via the Internet between a mobile player terminal operable by a player and a host computer system hosting an interactive electronic gaming session;

cause a list of multiple interactive electronic games available to a player using the mobile player terminal to be presented on a display device of the mobile player terminal;

monitor an interaction area of the mobile player terminal for player interactions to detect a selection by the player of:

an interactive electronic game from the list for game play; and objectives that represent achievable goals during game play of the interactive electronic game;

after selection by the player of the interactive electronic game from the list, receive, via the communications interface and from one or more player terminals, information regarding a baseline skill distribution, wherein the instructions when executed by the one or more processors further cause the machine to collect the information regarding the baseline skill distribution offline or over a period of time from the one or more player terminals for the interactive electronic game selected by the player; and set an initial payout amount for the interactive electronic game based on the information regarding the baseline skill distribution;

adjust one or more gaming parameters for the interactive electronic game;

set a skill level of the interactive electronic game according to the one or more gaming parameters;

cause action from an interactive electronic gaming session of the interactive electronic game being played by the player to be presented on the display device;

monitor the interactive electronic gaming session for completion of the objectives by the player after initiation of the interactive electronic game for play by the player;

receive, via the communications interface, live game play statistics from one or more additional player terminals operable by at least one other player participating in the interactive electronic gaming session;

update the information regarding the baseline skill distribution based on the live game play statistics; and determine a variable payout amount for the interactive electronic game based upon:

the skill level;

completion of the objectives by the player within the interactive electronic game; and the updated information regarding the baseline skill level distribution.

* * * * *